United States Patent
Qin et al.

(10) Patent No.: US 11,295,084 B2
(45) Date of Patent: Apr. 5, 2022

(54) COGNITIVELY GENERATING INFORMATION FROM VIDEOS

(71) Applicant: International Business Machines Corporation, Armonk, NY (US)

(72) Inventors: Wei Qin, Beijing (CN); Jing Jing Zhang, Beijing (CN); Xi Juan Men, Beijing (CN); Xiaoli Duan, Beijing (CN); Yue Chen, Beijing (CN); Dong Jun Zong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 16/571,451

(22) Filed: Sep. 16, 2019

(65) Prior Publication Data

US 2021/0081497 A1   Mar. 18, 2021

(51) Int. Cl.
*G06K 9/62* (2022.01)
*G06F 40/295* (2020.01)
(Continued)

(52) U.S. Cl.
CPC ............ *G06F 40/295* (2020.01); *G06F 40/35* (2020.01); *G06N 3/0454* (2013.01); *G06N 3/08* (2013.01);
(Continued)

(58) Field of Classification Search
CPC ..... G06F 40/295; G06F 40/35; G06N 3/0454; G06N 3/08; G06N 3/0445; G06V 20/40;
(Continued)

(56) References Cited

U.S. PATENT DOCUMENTS

| | | | |
|---|---|---|---|
| 5,930,379 | A | 7/1999 | Rehg et al. |
| 9,076,041 | B2 | 7/2015 | Bentley et al. |
| 9,191,639 | B2 | 11/2015 | Kuspa |
| 9,646,652 | B2 | 5/2017 | Adsumilli et al. |

(Continued)

FOREIGN PATENT DOCUMENTS

| | | |
|---|---|---|
| CN | 1777916 A | 5/2006 |
| CN | 102222227 B | 10/2011 |

(Continued)

OTHER PUBLICATIONS

Aafaq et al., "Video Description: A Survey of Methods, Datasets and Evaluation Metrics", arxiv.org, Mar. 18, 2019, 28 pages, <https://arxiv.org/pdf/1806.00186.pdf>.

(Continued)

*Primary Examiner* — Charlotte M Baker
(74) *Attorney, Agent, or Firm* — Sonny Z. Zhan

(57) ABSTRACT

In an approach for detecting key messages for a video, a processor builds a role model based on data from one or more data sources, with an identification feature of each role in a video. A processor samples a plurality of frames of the video. A processor identifies a key object presented in the plurality of frames. The key object is a role in the video. A processor recognizes a movement scenario associated with the role. A processor dynamically updates the role model based on the movement scenario. A processor identifies a role name based on the movement scenario. A processor generates a description script associated with the movement scenario for the role. A processor outputs the description script.

20 Claims, 19 Drawing Sheets

(51) Int. Cl.
- *G06N 3/04* (2006.01)
- *G10L 13/08* (2013.01)
- *G06N 3/08* (2006.01)
- *G06F 40/35* (2020.01)
- *H04N 21/84* (2011.01)
- *G06V 20/40* (2022.01)
- *G06V 40/20* (2022.01)
- *G06V 40/16* (2022.01)

(52) U.S. Cl.
CPC ............ *G06V 20/40* (2022.01); *G06V 40/168* (2022.01); *G06V 40/20* (2022.01); *G10L 13/08* (2013.01); *H04N 21/84* (2013.01)

(58) Field of Classification Search
CPC .... G06V 40/168; G06V 40/20; G06V 40/174; G10L 13/08; H04N 21/84; H04N 21/8405; G06K 9/6272
USPC ......................................................... 382/156
See application file for complete search history.

(56) References Cited

U.S. PATENT DOCUMENTS

| | | |
|---|---|---|
| 2009/0190899 A1 | 7/2009 | Bangalore |
| 2019/0156134 A1* | 5/2019 | Krishnan ............... A61B 5/225 |

FOREIGN PATENT DOCUMENTS

| | | |
|---|---|---|
| CN | 102890781 B | 1/2013 |
| CN | 103218608 B | 7/2013 |
| CN | 104113789 A | 10/2014 |

OTHER PUBLICATIONS

Pun et al., "Image and Video Processing For Visually Handicapped People", EURASIP, Journal on Image and Video Processing, vol. 2007, Issue 5, Article ID 25214, Dec. 2007, 12 pages, <https://dl.acm.org/citation.cfm?id=1384967>.

Mell et al., "The NIST Definition of Cloud Computing", Recommendations of the National Institute of Standards and Technology, Special Publication 800-145, Sep. 2011, 7 pages.

* cited by examiner

COGNITIVELY GENERATING INFORMATION FROM VIDEOS

BACKGROUND

The present disclosure relates generally to the field of imaging and video processing, and more particularly to cognitively generating key information from a video.

Image processing originates from a general field of signal processing and covers methods used to segment an object of interest. Video processing covers most of the image processing methods, but also includes methods where the temporal nature of video data is exploited. Artificial neural networks are computing systems that are inspired by the biological neural networks. An artificial neural network is based on a collection of connected units or nodes called artificial neurons, which loosely model the neurons in a biological brain. Each connection, like the synapses in a biological brain, can transmit a signal from one artificial neuron to another. An artificial neuron that receives a signal can process it and then signal additional artificial neurons connected to it. In artificial neural network implementations, the signal at a connection between artificial neurons is a real number, and the output of each artificial neuron is computed by some non-linear function of the sum of its inputs. The connections between artificial neurons are called edges. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

An original goal of the artificial neural network approach was to solve problems in the same way that a human brain would. However, over time, attention moved to performing specific tasks, leading to deviations from biology. Artificial neural networks have been used on a variety of tasks, including computer vision, speech recognition, machine translation, social network filtering, playing board and video games and medical diagnosis.

SUMMARY

Aspects of an embodiment of the present disclosure disclose an approach for detecting key messages from a video. A processor builds a role model, based on data from one or more data sources, with an identification feature of each role in a video. The role model includes a machine learning model trained to recognize each role by each respective identification feature. A processor samples a plurality of frames of the video. A processor identifies a key object presented in the plurality of frames. The key object is a role in the video. A processor recognizes a movement scenario associated with the role. A processor generates a frame description for each frame through a first neural network. A processor removes from each frame that is not associated with the role in the frame. A processor, upon removing the information that is not associated with the role, enters the plurality of frames, in a timeline sequence, to a second neural network. A processor generates the movement scenario associated with the role in the timeline sequence. The movement scenario is a text description associated with the movement. A processor dynamically updates the role model based on the movement scenario. A processor identifies a role name based on the movement scenario. A processor generates a description script associated with the movement scenario for the role. A processor output the description script.

DETAILED DESCRIPTION

Figure 1:
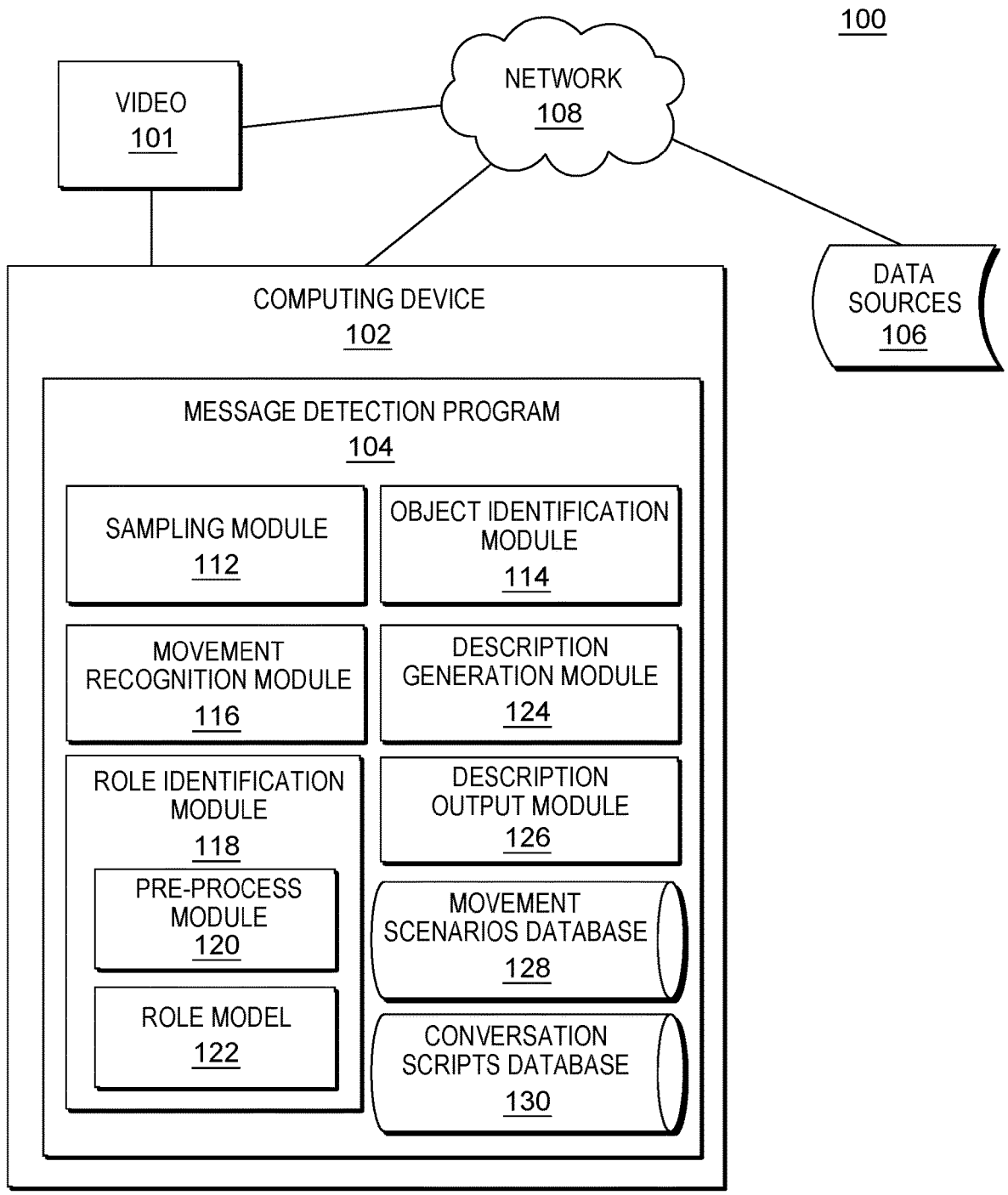
FIG. 1 is a functional block diagram illustrating a video message detection environment, in accordance with an embodiment of the present disclosure.

The present disclosure is directed to systems and methods for cognitively detecting key messages in a video based on roles and their movement and expression scenarios.

Nowadays videos are playing a more and more important role in people's daily life. Body gesture and micro face expressions are critical to understand what is happening in a video. But for people who are unable to watch the video (e.g., people with a visual disability, people who are driving or in other situations without a safe and conveniently accessible display device) to watch the video, they are not able to get the information such as, for example, body movements and facial expressions presented in the video, which can be important to the whole story. For example, tears fall down a person's face, eyes blink, or an actor clenches his fist. People cannot get a clear picture without seeing or knowing such actions or movements. The present disclosure discloses a methodology that intends to solve the issue by cognitively identifying significant video shots and then transforming the information into audio.

The present disclosure discloses a cognitive method to detect key messages of a video based on roles and role movements in the video. The present disclosure discloses detecting key messages, for example, by analyzing conversations, metadata, and social network to build the role model of the video, identifying the people related movements from the video, leveraging movements and conversations to build and update the role model, linking the role info and the corresponding movement information to generate a video script, and outputting the video script by audio to external audience.

The present disclosure discloses a method to discover key movements which are associated with roles from the video. The present disclosure further discloses a method to discover role information (e.g., role names) through context such as conversations and movements from a video, which would help audience better appreciate the video. The present disclosure further discloses automatically generating video scripts with key movements and outputting the video scripts by audio or other suitable media to audience.

The present disclosure also discloses analyzing static data including metadata, social network to build a role model of the video. An example scenario is to associate the actor list with the actors' pictures on the Internet to build the role model with the actors' facial information. The present disclosure discloses identifying role related movement from the video and leveraging movements and conversations to build a role model dynamically. The program generates a video description script by combining the role information and corresponding movement information.

In a pre-play stage, for example, each sampled frame of the video can be put into a trained convolutional neural network, and a picture description can be generated as output for each frame. The picture description may include information such as timestamp, background, detected objects and object status, detected role and role status. The picture description of each frame can be first processed to remove unrelated information and then be put into a trained recurrent neural network to generate a key movement scenario in time sequence.

In an example, when playing the video, each sampled frame can be used to match the role model, and role movements can be identified through movements record with timeline which is built up in a pre-play stage. Each generated video description script can be output by audio or other suitable output method to audience.

The present disclosure will now be described in detail with reference to the Figures. FIG. 1 is a functional block diagram illustrating a video message detection environment, generally designated 100, in accordance with an embodiment of the present disclosure.

In the depicted embodiment, video message detection environment 100 includes video 101, computing device 102, data sources 106, and network 108. In various embodiments of the present disclosure, video 101 can be a movie, a short-video, a self-recorded video, an analog video, a digital video, a live video stream, or any electronic medium for the recording, copying, playback, broadcasting, and display of moving visual media. In the depicted embodiment, video 101 is located externally and accessed directly with computing device 102 or through a communication network such as network 108. However, in other embodiments, video 101 may be located on computing device 102.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to message detection program 104 and network 108 and is capable of processing program instructions and executing message detection program 104, in accordance with an embodiment of the present disclosure. Computing device 102 may include internal and external hardware components, as depicted and described in further detail with respect to FIG. 17.

Further, in the depicted embodiment, computing device 102 includes message detection program 104. In the depicted embodiment, message detection program 104 is located on computing device 102. However, in other embodiments, message detection program 104 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and message detection program 104, in accordance with a desired embodiment of the disclosure.

Message detection program 104 is configured to detect key messages based on roles and movements of the roles in video 101. The roles may be people characters, cartoon characters or other characters presented in video 101. Message detection program 104 includes sampling module 112, object identification module 114, movement recognition module 116, role identification module 118, description generation module 124, and description output module 126. Message detection program 104 may also include movement scenarios database 128 and conversation scripts database 130.

Sampling module 112 samples frames of video 101. A frame is generally one of the many still images which compose the complete moving picture. Sampling module 112 may compress the sampled frames of video 101. In general, compression is a reversible conversion (encoding) of data that contains fewer bits than in original data. The reducing of data bits allows a more efficient storage and transmission of the data.

Object identification module 114 identifies and recognizes key objects in each frame of video sampled with sampling module 112. Object identification module 114 may use object recognition technology for finding and identifying the key objects in each frame. Object recognition technology may include edge detection, edge matching, greyscale matching, gradient matching, appearance-based methods, feature-based methods, and other suitable recognition technology for identifying objects in an image or video frame. Object identification module 114 may identify people, animals, tools, and background objects from each frame. The identified objects may include roles in video 101. As discussed above, the roles may be people characters, cartoon characters or other characters presented in video 101.

Movement recognition module 116 recognizes movement scenarios associated with the roles in video 101. The movement scenarios may be text descriptions of the movements associated with the roles. Movement recognition module 116 is configured to generate frame description for each sampled frame using a first neural network. The first neural network, for example, is a convolutional neural network. The convolutional neural network can be a class of deep neural networks for analyzing frames and generating frame descriptions. Movement recognition module 116 may remove unrelated information with roles in video 101 from frame descriptions of the sampled frames. Movement recognition module 116 may sort and arrange frame descriptions in a timeline sequence and enter the time-lined frame descriptions into a second neural network as input to recognize and generate movement scenarios associated with the roles. The second neural network, for example, can be a recurrent neural network. In an example, the recurrent neural network is a class of artificial neural networks where connections between nodes form a directed graph along a temporal sequence. A recurrent neural network may use its internal state (memory) to process sequences of inputs of frame descriptions. Movement recognition module 116 recognizes and generates movement scenarios associated with the roles in a timeline sequence through the recurrent neural network. For example, the recurrent neural network is pre-trained with data that can recognize and generate movement scenarios in timeline based on frame descriptions. Movement recognition module 116 may save each recognized movement scenario into movement scenarios database 128. An example embodiment of movement recognition module 116 is described in more detail in FIG. 2.

Role identification module 118 includes pre-process module 120 and role model 122. Role identification module 118 is configured to build a role model initially based on one or more data sources 106 with an identification feature of each role in video 101. Role model 122 is a machine learning model that is trained to recognize each role by the identification feature, such as a facial feature of roles. Role identification module 118 is also configured to dynamically build and update role model 122. Role identification module 118 may dynamically build and update role model 122 based on the movement scenarios. Role identification module 118 may dynamically build and update role model 122 based on conversation scripts from video 101. Conversation scripts can be saved and accessed from conversation scripts database 130. Role identification module 118 may identify and match role names with recognized roles in video 101 based on the movement scenarios and conversation scripts. In an example, the conversation scripts can be available and accessible directly from video 101. In another example, the conversation scripts can be generated by using natural language processing techniques for video 101. More details about role identification module 118 are described in FIGS. 6-8 below.

Pre-process module 120 is configured to build and train role model 122. Pre-process module 120 receives training data by analyzing a list of roles in video 101 and searching data associated with the roles from various data sources 106. Data sources 106 may be, for example, from Internet in general, social media, and so on. Data from data sources 106 can be pictures of roles and can be as training data for role model 122. An example scenario is to associate the actor list with the actors' pictures in Internet to build role model 122 with the actors' facial information. Role model 122 is a machine learning model that can be trained to identify a role name in video 101 based on input of an identification feature, for example, a facial picture, of the role. Role model 122 may be trained and configured to identify and match a role name using facial recognition techniques. In general, a facial recognition technique is a technology capable of identifying or verifying a person from a digital image or a video frame from a video source. For example, facial recognition techniques can work by comparing selected facial features from a given image with faces within a database to identify and verify a person from the digital image. More details about role identification module 118 including pre-process module 120 and role model 122 are described in FIGS. 6-8 below.

Description generation module 124 is configured to generate description scripts of key messages associated with roles and movement scenarios of the roles in video 101. In an example, for each current frame, description generation module 124 determines whether any role name replacement has happened in current frame by reading role model 122 and matching any role name in current frame with role model 122. If description generation module 124 determines a role name replacement has happened, description generation module 124 outputs a role name for the current frame, for example, adding a description such as "role with such character descriptions turns out to be "role name". If description generation module 124 determines a role name replacement has not happened for current frame, description generation module 124 determines whether the current frame includes any movement scenario for any role. If yes, description generation module 124 adds a role name to the associated role movement in description and generates description scripts for the key messages associated with the role and movement scenarios for the role.

Description output module 126 is configured to output description scripts generated from description generation module 124. In an example, description output module 126 may output description scripts by audio. In another example, description output module 126 may output description scripts by texts or any other suitable output methods for audience to appreciate and understand.

Figure 2:
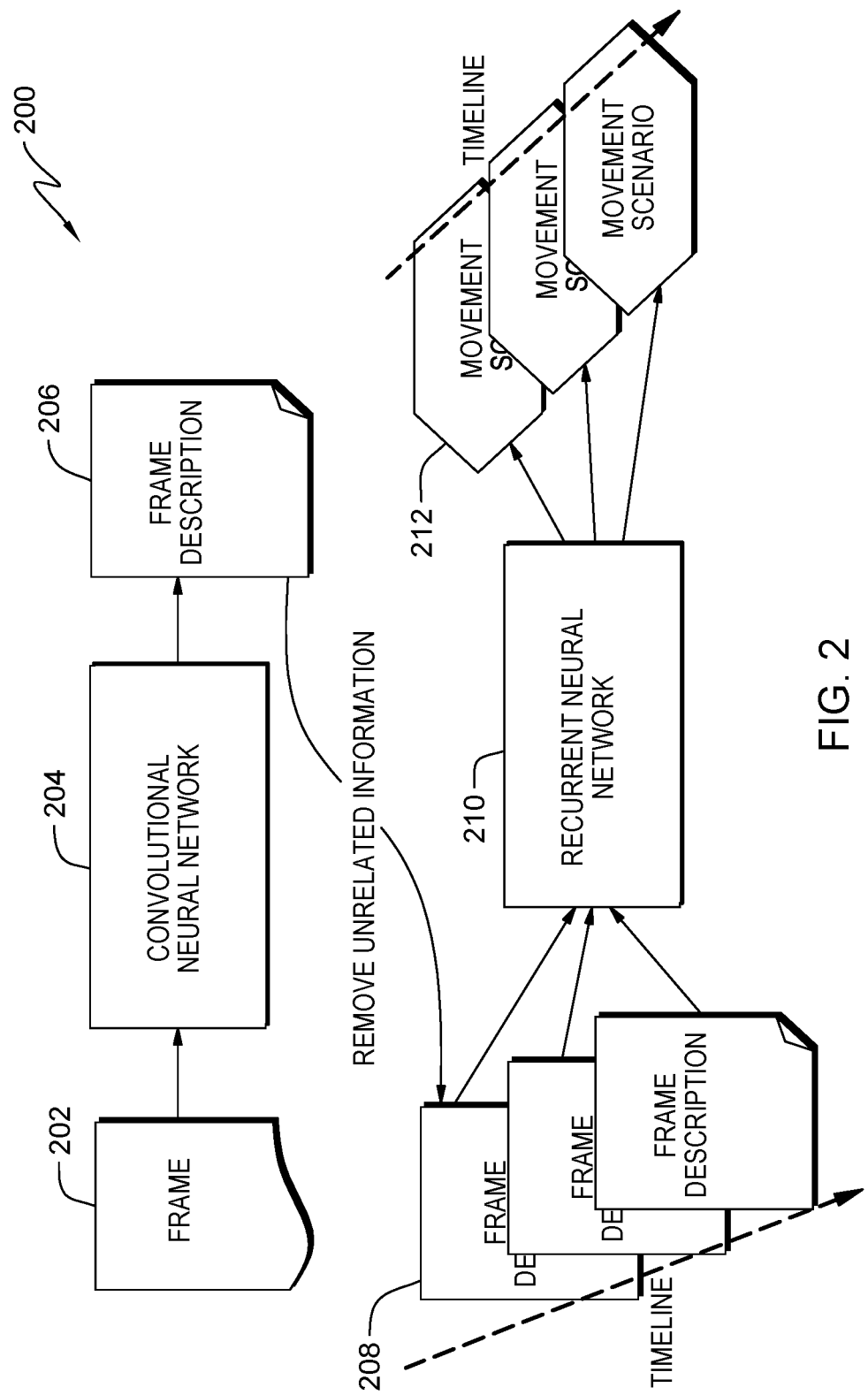
FIG. 2 is a diagram depicting a movement recognition module in a message detection program included in a computing device of FIG. 1, in accordance with an embodiment of the present disclosure.

FIG. 2 is a diagram 200 depicting movement recognition module 116 in accordance with an embodiment of the present disclosure.

Movement recognition module 116 operates to recognize key movements associated with roles in video 101. For each sampled frame 202 as described above in FIG. 1, convolutional neural network 204 is pre-trained and configured to generate frame description 206 for each frame 202. Frame description 206 may include timestamp, background, detected objects, object status, detected roles, and role status. Movement recognition module 116 removes unrelated information of each frame description 206 and puts into recurrent neural network 210 in time sequence, to generate key movement scenarios.

Convolutional neural network 204 is, for example, a class of deep neural networks for analyzing visual imagery. Convolutional neural network 204 may employ a mathematical operation called convolution. In general, convolution is a specialized kind of linear operation. Convolutional neural network 204 may consist of an input and an output layer, as well as multiple hidden layers. The hidden layers of convolutional neural network 204 may consist of a series of convolutional layers that convolve with a multiplication or other dot product. Convolutional neural network 204 may use convolution in place of general matrix multiplication in at least one of their layers. In another embodiment, convolutional neural network 204 may be any other neural network or machine learning model that is able to generate frame description 206 for each frame 202.

Movement recognition module 116 operates to remove unrelated information with roles in video 101 from frame description 206 for each frame 202. Movement recognition module 116 is configured to sort each frame description 208 in timeline and enter the time-lined frame descriptions 208 into recurrent neural network 210. Recurrent neural network 210 is pre-trained and configured to recognize and generate movement scenarios 212 in timeline based on frame descriptions 208 associated with roles in frames 202. In an example, recurrent neural network 210 is a class of artificial neural networks where connections between nodes form a directed graph along a temporal sequence. Recurrent neural network 210 may exhibit temporal dynamic behavior. Recurrent neural network 210 can use its internal state (memory) to process sequences of inputs of frame descriptions 208. In another embodiment, recurrent neural network 210 may be any other neural network or machine learning model that is able to recognize and generate movement scenarios 212 in timeline based on frame descriptions 208 associated with roles in frames 202. Movement recognition module 116 may save each movement scenario 212 in timeline into movement scenarios database 128.

Figure 3:
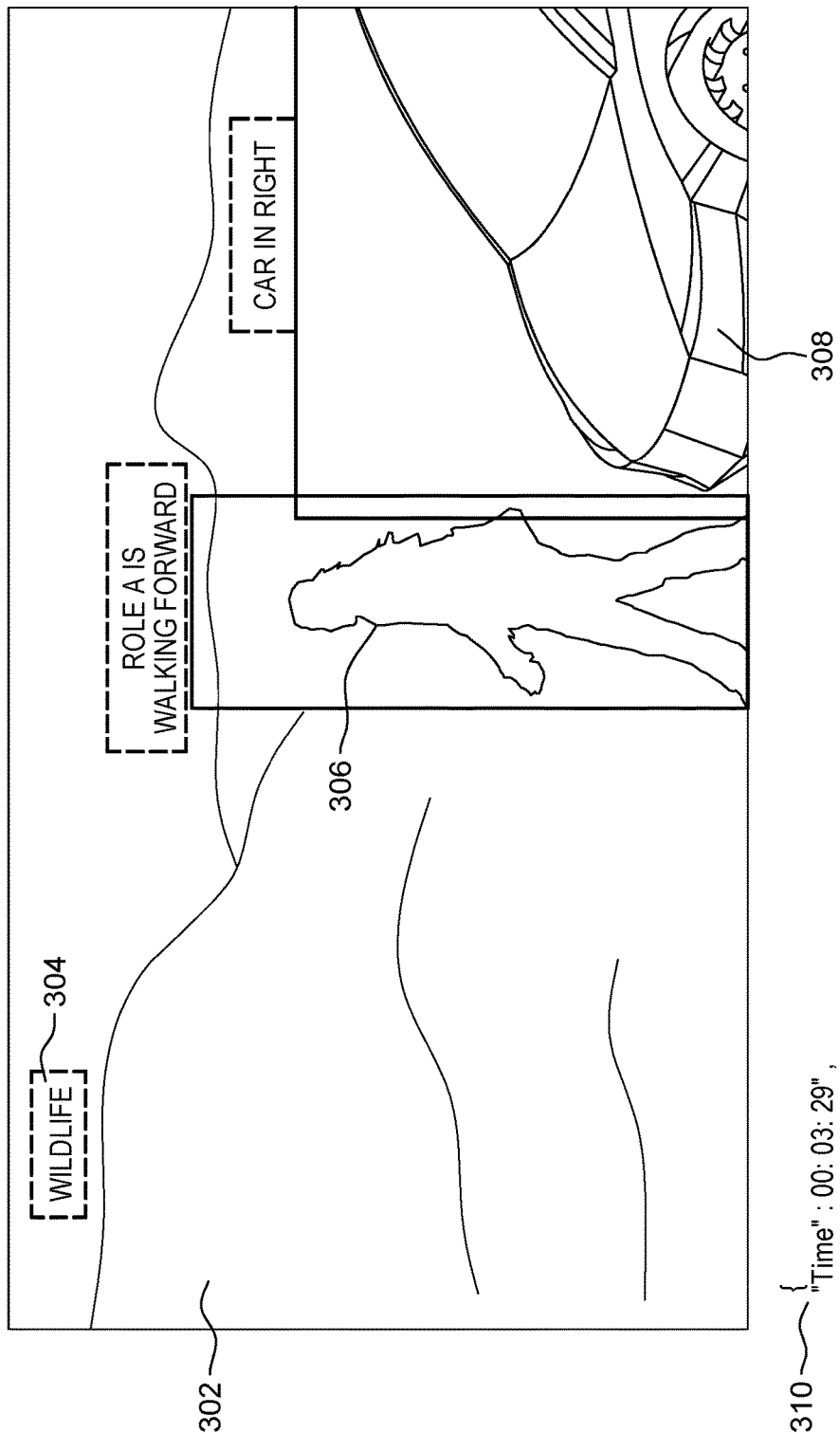
FIGS. 3-5 are a set of example frames from an example video demonstrating operations of the message detection program included in the computing device of FIG. 1, in accordance with an embodiment of the present disclosure.
Figure 4:
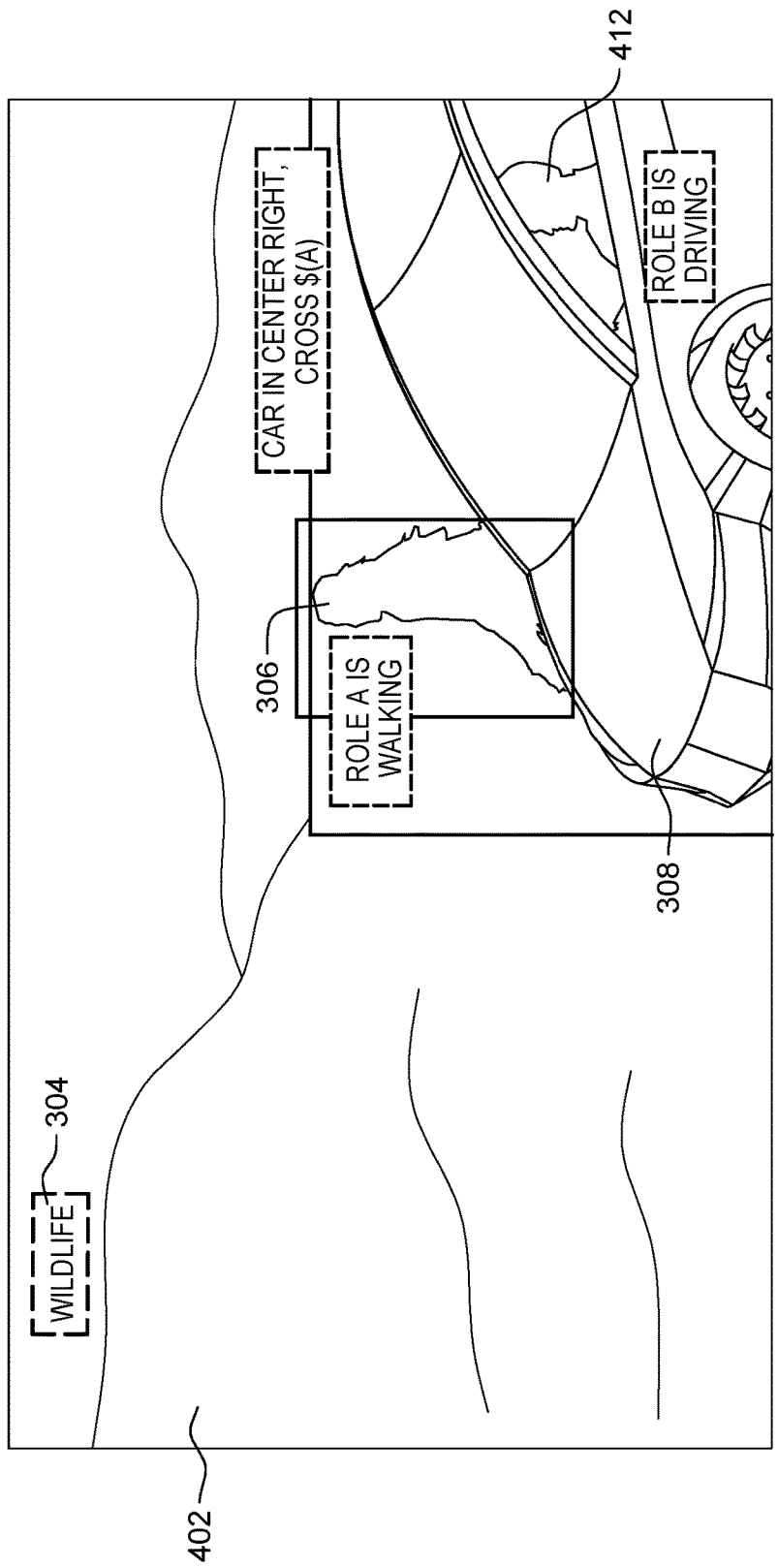
Figure 5:
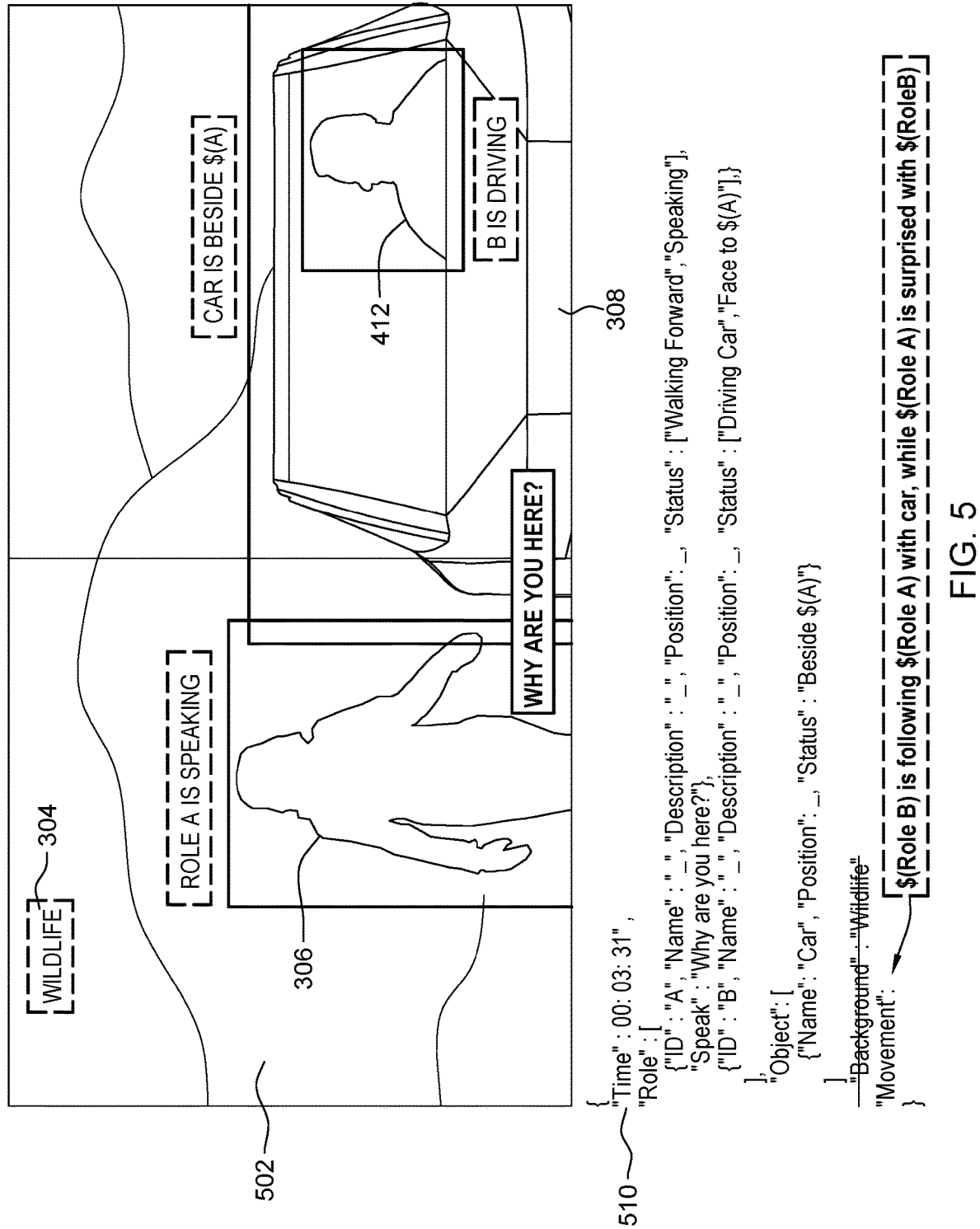

FIGS. 3-5 are a set of example frames from an example video demonstrating operations of message detection program 104 in accordance with an embodiment of the present disclosure.

In FIG. 3, frame 302 is sampled by sampling module 112 at timestamp 310 in a video. Object identification module 114 in message detection program 104 detects and identifies objects including wildlife background 304, role A 306, and car 308 in frame 302. Message detection program 104 identifies role A 306 as a person and uses letter "A" to name the person. Message detection program 104 does not know the name of role A 306 yet. Message detection program 104 ignores unrelated information of wildlife background 304 and car 308 because they are not associated with any role in the video. Message detection program 104 recognizes the position and status of role A 306. Message detection program 104 recognizes that the status of role A 306 is "walking forward".

In FIG. 4, frame 402 is sampled at timestamp 410. Object identification module 114 detects and identifies objects including wildlife background 304, role A 306, car 308, and role B 412 in frame 402. Message detection program 104 removes unrelated information of wildlife background 304 because the unrelated information of wildlife background 304 is not associated with any role in the video. Message detection program 104 keeps information of car 308 because car 308 is now crossing role A 306 and is related to role A 306. In addition, message detection program 104 detects role B 412 driving car 308. Message detection program 104 recognizes that the status of role A 306 is "walking". The status of role B 412 is "driving".

Figure 14:
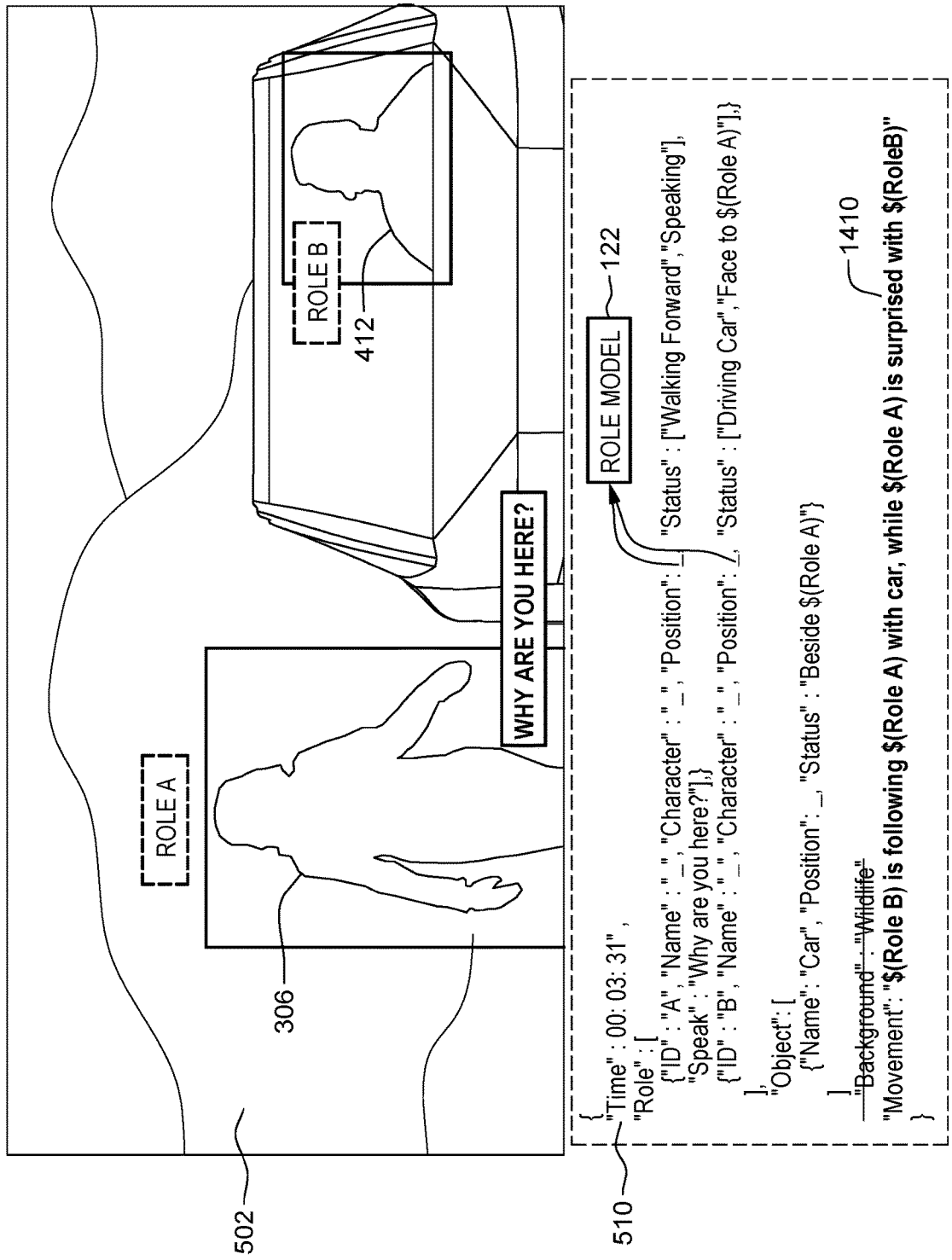
FIGS. 14-15 are example frames demonstrating operations of the description generation module in the message detection program included in the computing device of FIG. 1, in accordance with an embodiment of the present disclosure.
Figure 15:
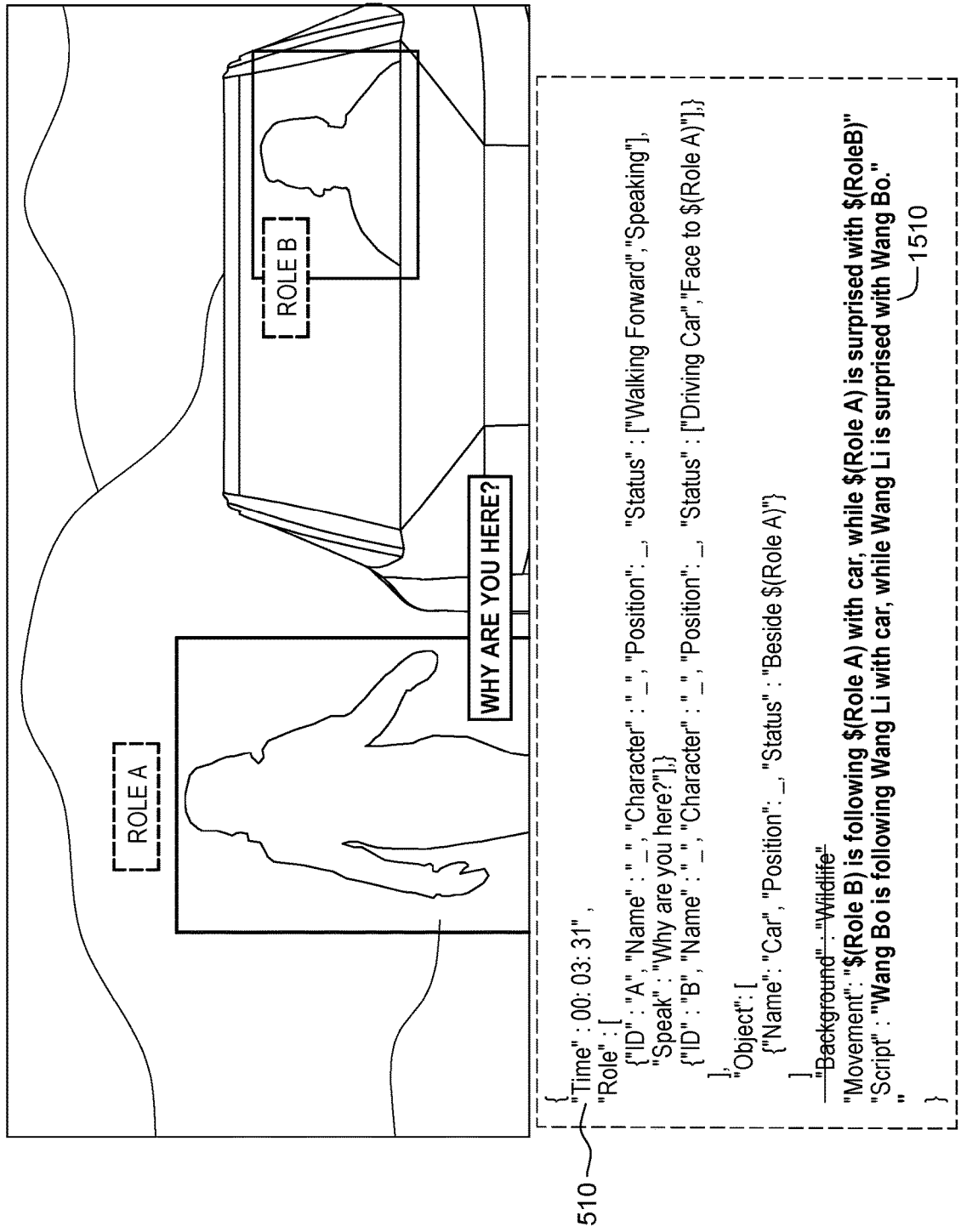

In FIG. 5, frame 502 is sampled at timestamp 510. Object identification module 114 detects and identifies objects of wildlife background 304, role A 306, car 308, and role B 412 in frame 502. Message detection program 104 removes unrelated information of wildlife background 304 as it is not associated with any role. Car 308 is beside role A 306. Role B 412 is driving car 308 next to role A 306. Role A 306 is speaking a short sentence "why are you here" based on the conversation script. According to these three frames 302, 404, and 502 together, movement recognition module 116 in message detection program 104 recognizes a movement scenario: role B is following role A with a car, while role A is surprised with role B. At this moment, the names of roles A and B have not been recognized yet. FIGS. 14 and 15 below will continue to demonstrate recognizing role names of roles A and B.

Figure 6:
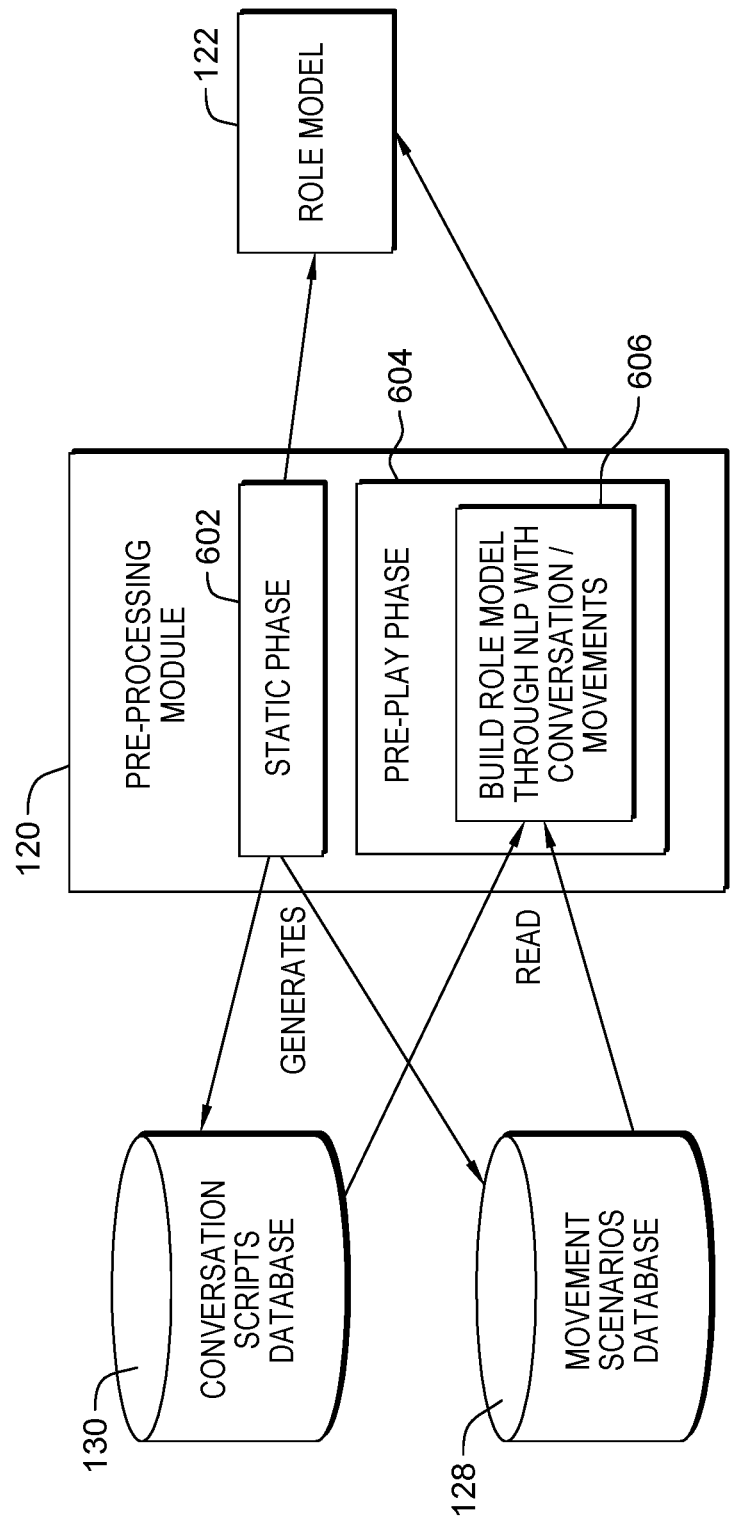
FIG. 6 is a diagram demonstrating operations of a role identification module in the message detection program included in the computing device of FIG. 1, in accordance with an embodiment of the present disclosure.

FIG. 6 is a diagram 600 demonstrating operations of role identification module 118 in accordance with an embodiment of the present disclosure.

Role identification module 118, as described in FIG. 1, includes pre-process module 120 and role model 122. Role identification module 118 is configured to build a role model initially based on one or more data sources 106 with an identification feature of each role in video 101. Role identification module 118 is configured to dynamically update and build role model 122. Role identification module 118 may dynamically build and update role model 122 based on the movement scenarios. Role identification module 118 may dynamically build and update role model 122 based on conversation scripts from video 101.

Pre-process module 120 may include static phase 602 and pre-play phase 604. During static phase 602, pre-process module 120 builds and trains role model 122 initially. In an example, during static phase 602, pre-process module 120 may receive and analyze a list of roles in video 101 and search for data associated with the roles from data sources 106. Data sources 106 may be, for example, from Internet in general, social media, and so on. Data can be face pictures of roles available from data sources 106. Details about static phase 602 are illustrated in FIG. 7.

Figure 8:
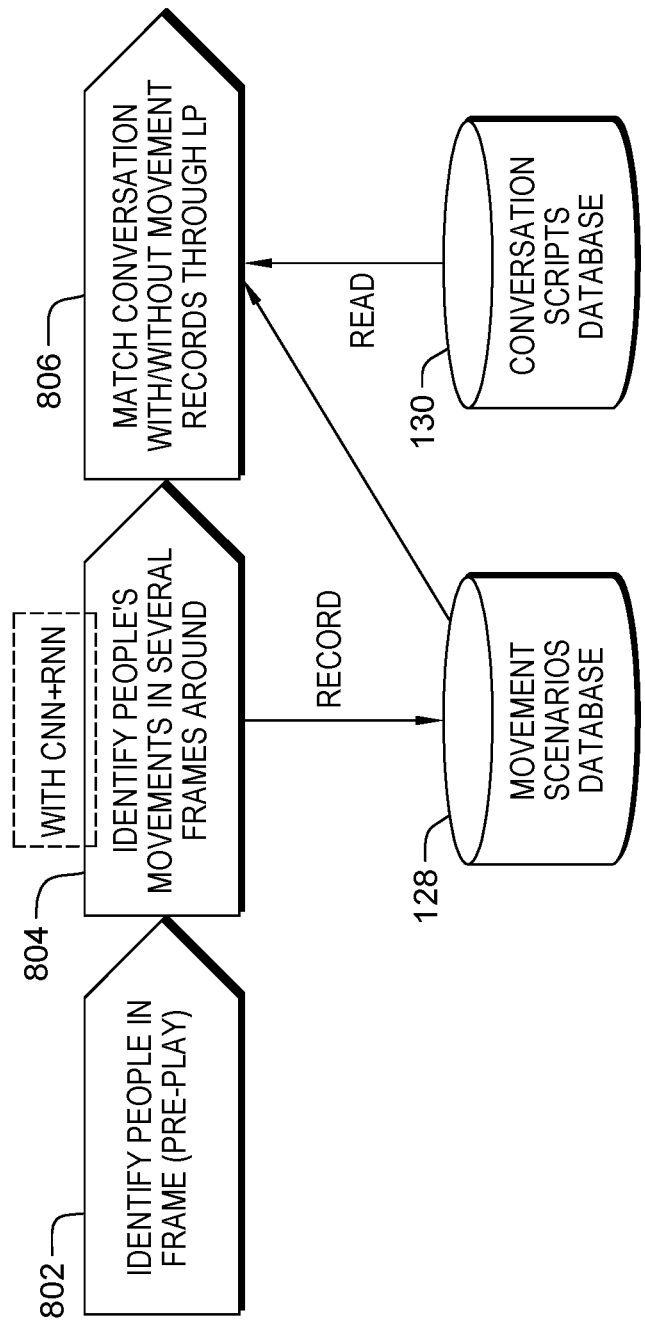
FIG. 8 is a flowchart demonstrating operations of the role identification module in the message detection program included in the computing device of FIG. 1, in accordance with an embodiment of the present disclosure.

Pre-process module 120 may include pre-play phase 604. During pre-play phase 604, pre-process module 120 may dynamically build and update role model 122 through natural language processing (NLP) with conversations and movements in video 101 at block 606. In an example, pre-process module 120 may directly capture conversation scripts provided in video 101. In another example, pre-process module 120 may generate conversation scripts using NPL techniques to convert voice messages to texts. Pre-process module 120 may save the generated conversation scripts into conversation scripts database 130. Movement scenarios are recognized in movement recognition module 116 and can be saved in movement scenarios database 128. In another example, pre-process module 120 may recognize names of roles based on conversation scripts and or movement records and further build and update role model 122. FIG. 8 further illustrates operational steps to dynamically build role model 122.

Figure 7:
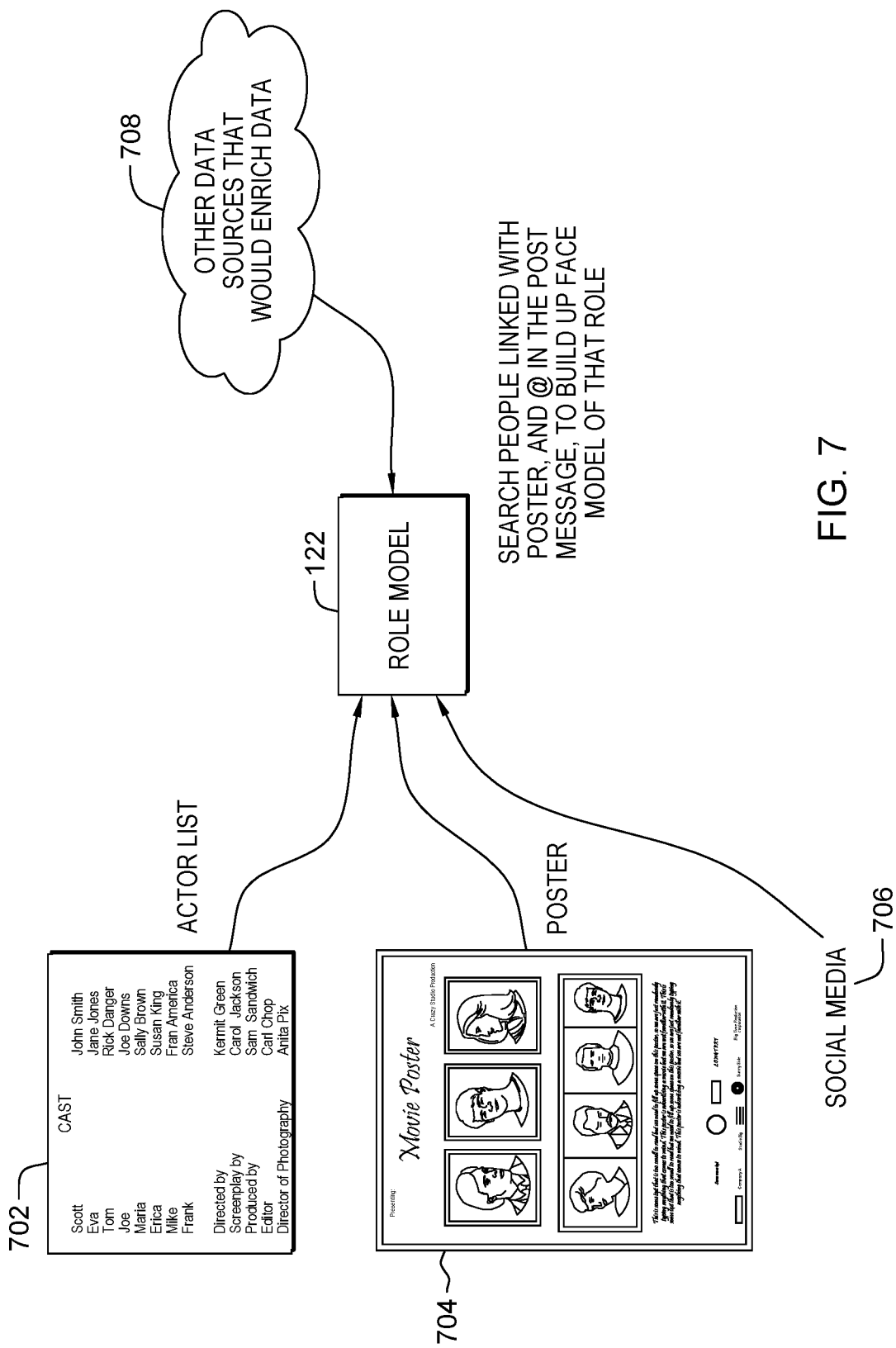
FIG. 7 is a diagram demonstrating a static phase of a pre-processing module included in the role identification module of FIG. 6, in accordance with an embodiment of the present disclosure.

FIG. 7 is a diagram 700 demonstrating static phase 602 of pre-processing module 120 in accordance with an embodiment of the present disclosure.

During static phase 602, pre-process module 120 builds and trains role model 122 initially. Pre-process module 120 is configured to search for data associated with roles in video 101 from data sources 106. Data sources 106 may be, for example, from Internet in general, social media 706, and other data sources 708 that would enrich data for building role model 122. For example, pre-process module 120 may receive and analyze actor list 702 in video 101 and search online for face pictures associated with roles in actor list 702. Pre-process module 120 may also search for poster 704 associated with video 101. Pre-process module 120 may further search for social media 706 to get face pictures of roles in actor list 702. Data of collected face pictures are entered into role model 122 for training. Role model 122 is configured and trained to identify roles based on input of face pictures.

FIG. 8 is a flowchart 800 demonstrating operations of role identification module 118 in accordance with an embodiment of the present disclosure.

Role identification module 118 operates to train and build role model 122 using image data (e.g., people's facial pictures) collected during static phase 602. Role identification module 118 operates to train and dynamically build role model 122 using data including conversation scripts and movement records collected during pre-play phase 604 at block 606. Role identification module 118 operates to train and dynamically build role model 122 through NLP with conversation scripts database 130 and movement scenarios database 128.

In step 802, object identification module 114 identifies roles (e.g., people) in frames of video 101. In step 804, movement recognition module 116 recognizes roles' movements associated with frames around in video 101 using neural network techniques, for example, including convolutional neural network (CNN) and recurrent neural network (RNN) techniques. Movement recognition module 116 sends and saves recognized movement scenario records to movement scenarios database 128. The recognized movements records are in a timeline and have timestamps associated with each. In step 806, role identification module 118 matches conversation scripts with movement records through NLP. In another example, role identification module 118 may match conversation scripts without movement records through NLP.

Figure 9:
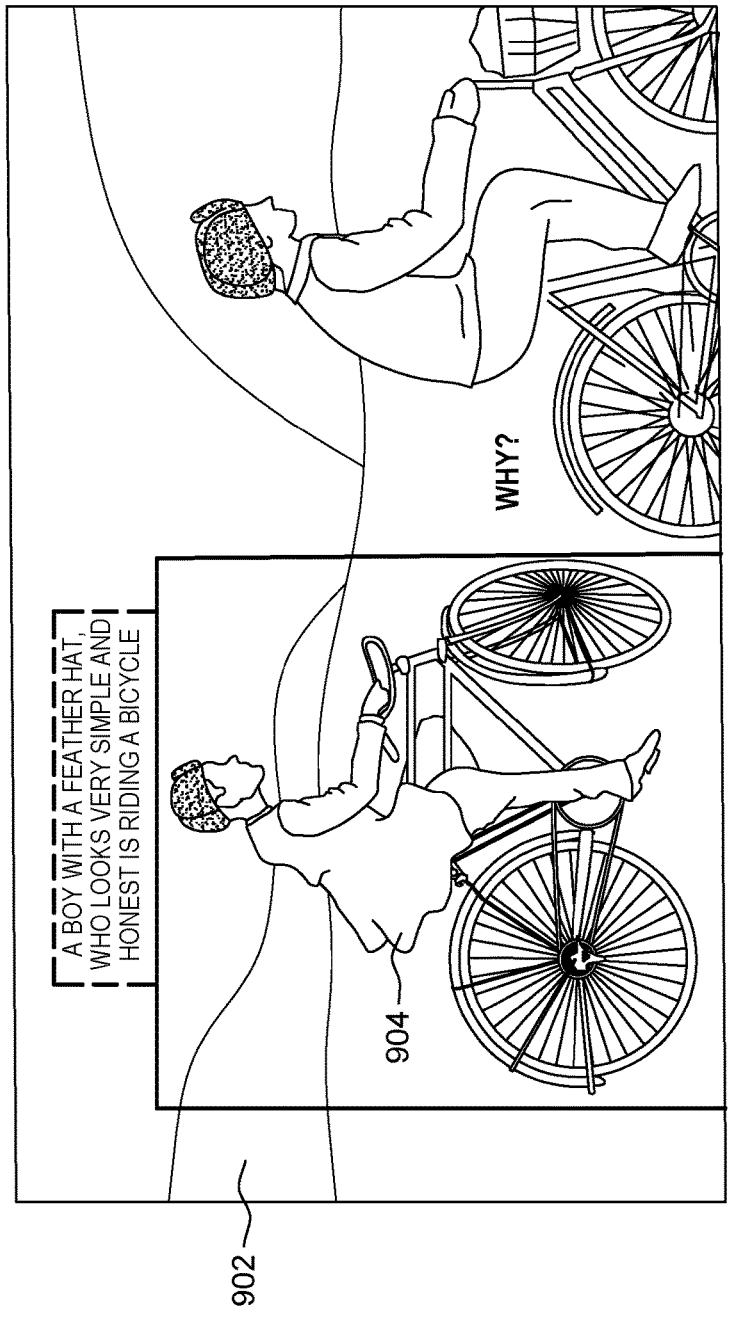
FIGS. 9-10 are example frames demonstrating operations of the role identification module recognizing role names based on conversation scripts, in the message detection program included in the computing device of FIG. 1, in accordance with an embodiment of the present disclosure.
Figure 10:
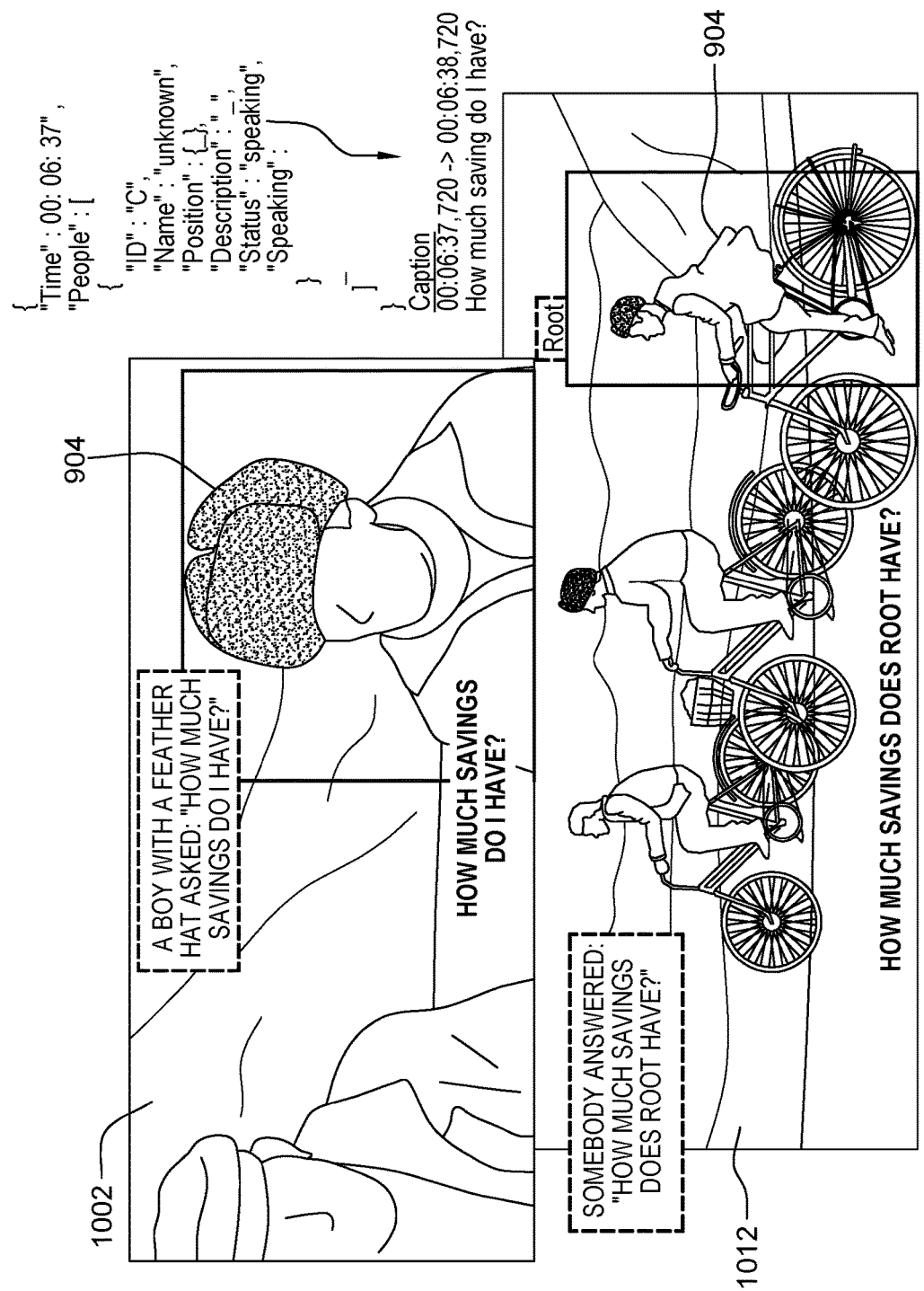

FIGS. 9-10 are example frames demonstrating operations of role identification module 118 recognizing role names based on conversation scripts in accordance with an embodiment of the present disclosure.

In FIG. 9, frame 902 is sampled at timestamp 910. Object identification module 114 detects and identifies role C 904. The name of role C 904 is unknown yet. Movement recognition module 116 generates picture description of frame 902, including description about role C 904, which description is "A boy with a feather hat, who looks very simple and honest." The recognized status of role C 904 is "riding a bicycle." The position of role C 904 is also recognized.

In FIG. 10, for frame 1002, movement recognition module 116 recognizes role C 904 is speaking. The name of role C 904 is still unknown, however, role C 904 has a description "A boy with a feather hat" generated by movement recognition module 116. For next frame 1012, movement recognition module 116 recognizes "How much savings does Root have" through conversation scripts (as shown in captions). Role identification module 118 utilizes NLP to extract a name called "Root" and understands the name "Root" refers to role C 904. Role C 904 now has the name "Root". Accordingly, role identification module 118 captures the facial picture of role C 904 (with the name of "Root") and saves the facial picture of role C 904 to build role model 122 with role name "Root" matching the captured facial picture.

Figure 11:
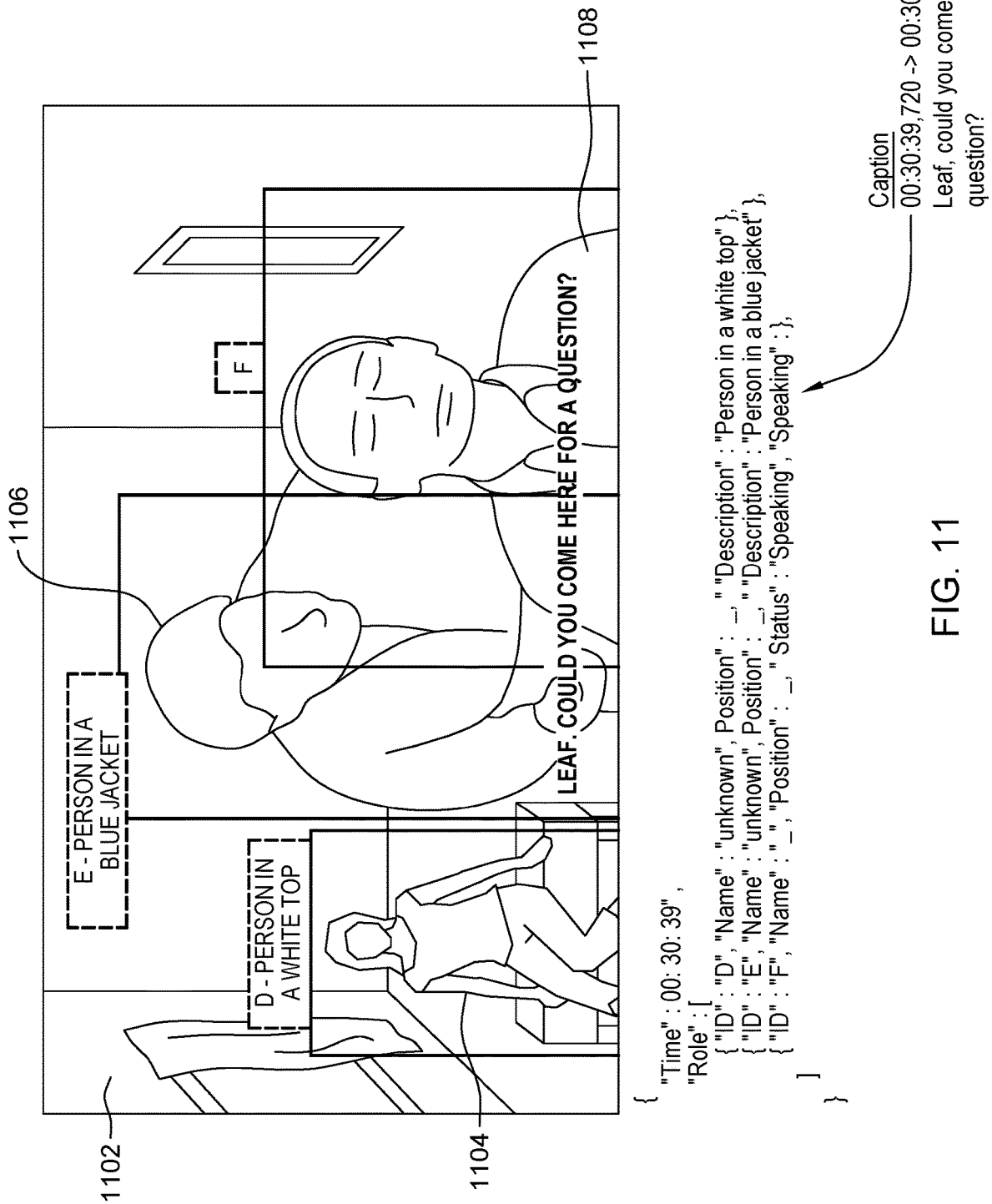
FIGS. 11-12 are example frames demonstrating operations of the role identification module recognizing role names based on movement scenarios, in the message detection program included in the computing device of FIG. 1, in accordance with an embodiment of the present disclosure.
Figure 12:
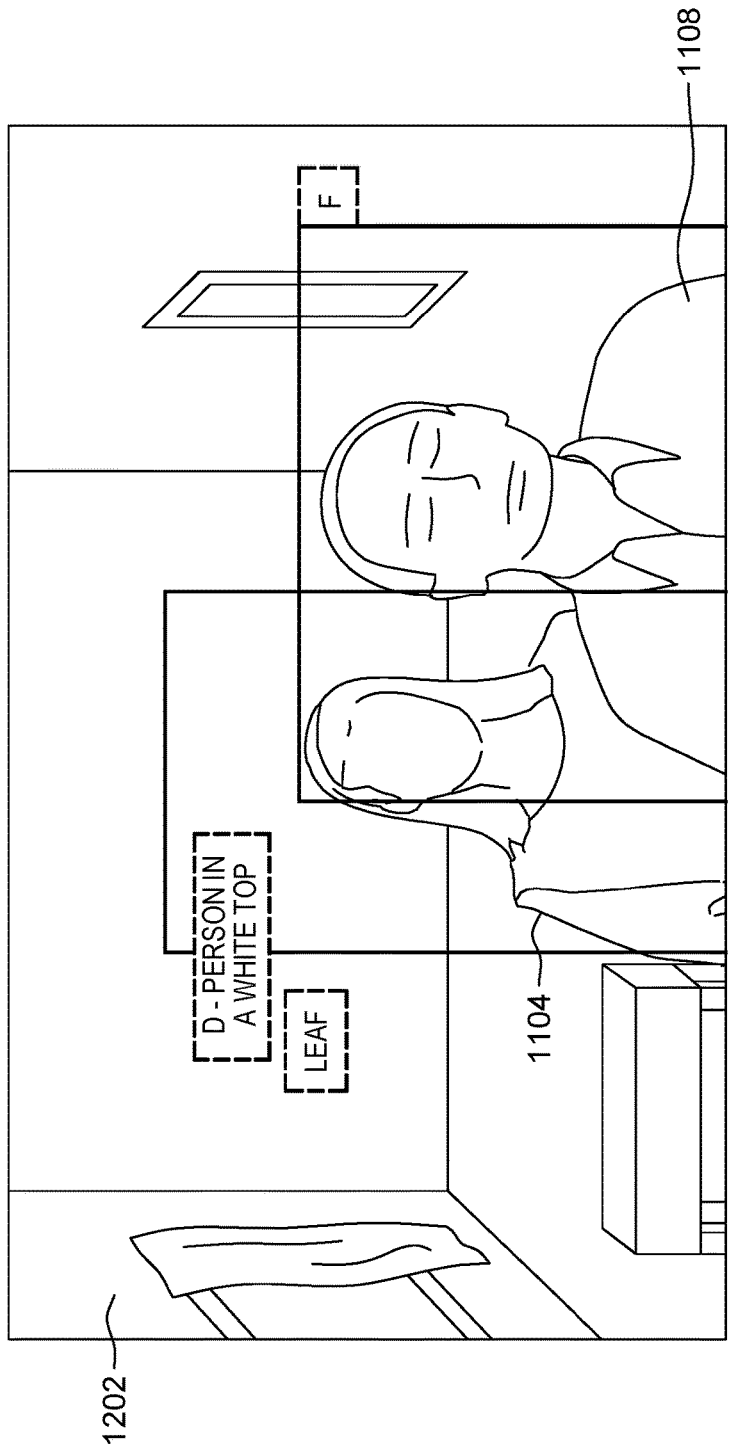

FIGS. 11-12 are example frames demonstrating operations of role identification module 118 recognizing role names based on movement scenarios in accordance with an embodiment of the present disclosure.

In FIG. 11, in frame 1102, object identification module 114 identifies three roles: role D 1104, role E 1106, and role F 1108. Movement recognition module 116 recognizes description for role D 1104 is "Person in White Top." Movement recognition module 116 recognizes description for role E 1106 is "Person in A Blue Jacket." Movement recognition module 116 recognizes role E 1108 is speaking "Leaf, could you come here for a question?" The conversation context from role E 1108 is from conversion scripts (as shown in captions in frame 1102).

In FIG. 12, in frame 1202, object identification module 114 identifies two roles: role D 1104, and role F 1108. Role E 1106 in previous frame 1102 is not in frame 1202. Movement recognition module 116 recognizes a movement scenario that is "$(Role D) goes to $(Role F) for a question." Role identification module 118 further recognizes the name of role D "Person in White Top" as "Leaf" based on the conversation script "Leaf, could you come here for a question?" using NLP techniques to recognize the name. Accordingly, role identification module 118 captures the facial picture of role D 1104 (with the name of "Leaf") and saves the facial picture of role D 1104 to update role model 122 with role name "Leaf" matching the captured facial picture.

Figure 13:
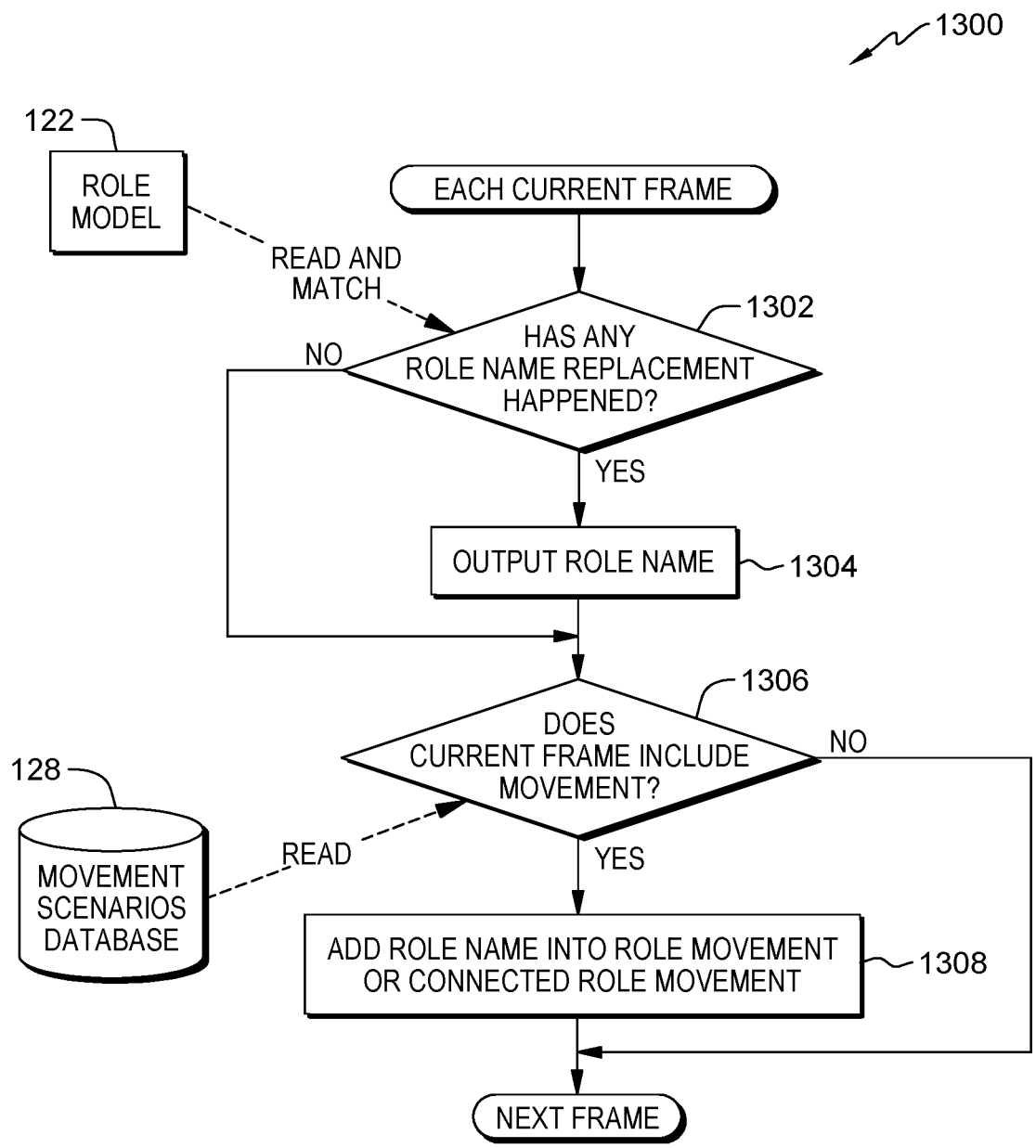
FIG. 13 is a flowchart depicting operational steps of a description generation module in the message detection program included in the computing device of FIG. 1, in accordance with an embodiment of the present disclosure.

FIG. 13 is a flowchart 1300 depicting operational steps of description generation module 124 in accordance with an embodiment of the present disclosure.

Description generation module 124 operates to generate description of key messages associated with roles and movements of the roles in video 101. In step 1302, for each current frame, description generation module 124 determines whether any role name replacement has happened in current frame by reading role model 122 and matching any role name in current frame with role model 122. If description generation module 124 determines a role name replacement has happened, in step 1304, description generation module 124 outputs a role name for the current frame, for example, adding a description such as "role with such character descriptions turns out to be 'role name'". If description generation module 124 determines a role name replacement has not happened for current frame, flowchart 1300 moves to step 1306. In step 1306, description generation module 124 accesses and reads movement scenarios database 128 and determines whether the current frame includes any movement scenario for any role. If not, flowchart 1300 moves to next frame to repeat. If yes, flowchart 1300 moves to step 1308 that description generation module 124 adds role name to role movement in description and generates a description script for the role.

FIGS. 14-15 are example frames demonstrating operations of description generation module 124 in accordance with an embodiment of the present disclosure.

In FIG. 14, back to the previous examples in FIG. 5, in frame 502, movement recognition module 116 in message detection program 104 recognizes movement scenario 1410: role B is following role A with a car, while role A is surprised with role B. Movement scenario 1410 is put into role model 122 to match a role name. Since role model 122 has now been built and updated, description generation module 124 finds that role A 306 name is "Wang Li" and role B's 412 name is "Wang Bo". Accordingly, description generation module 124 can generate description script 1510 "Wang Bo is following Wang Li with car, while Wang Li is surprised with Wang Bo" as shown in FIG. 15.

Figure 16:
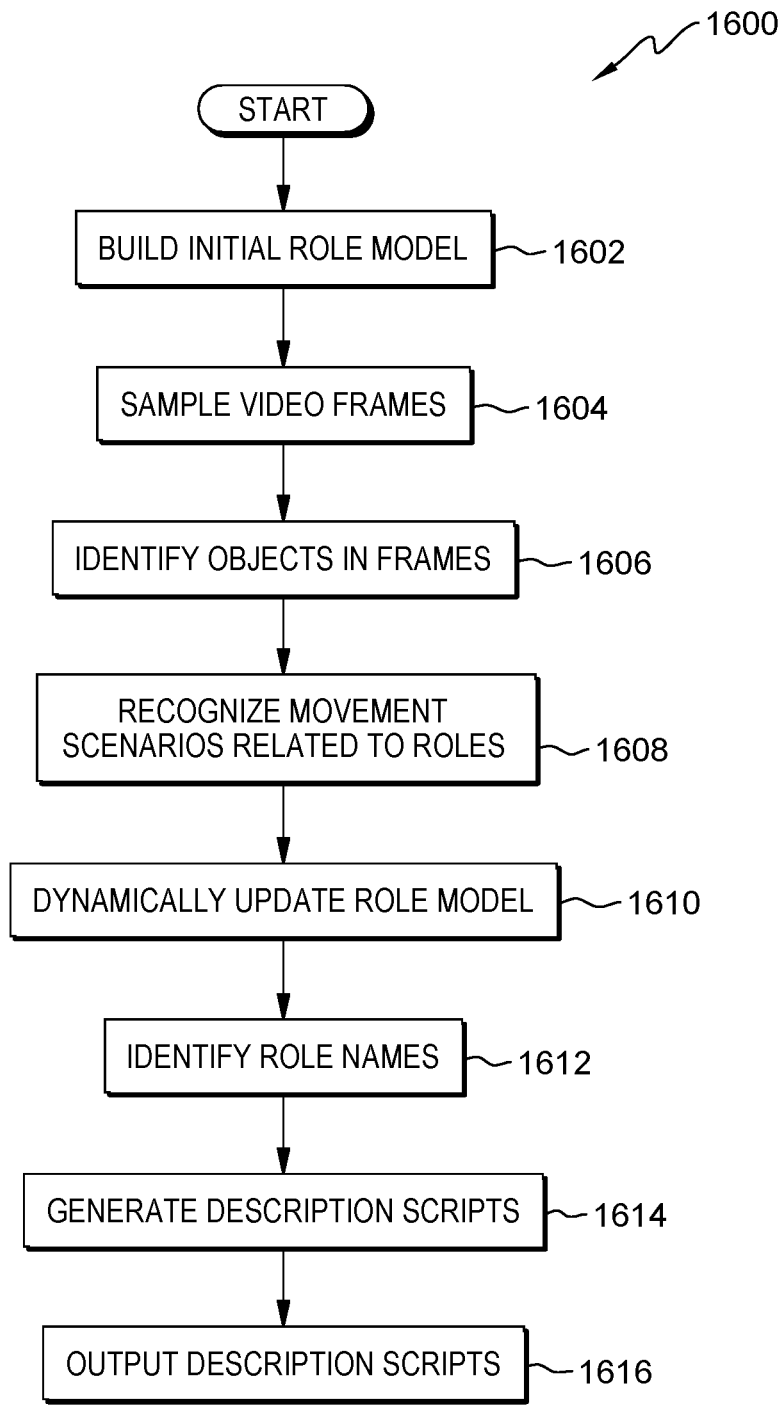
FIG. 16 is a flowchart 1600 depicting operational steps of the message detection program included in the computing device of FIG. 1, in accordance with an embodiment of the present disclosure.

FIG. 16 is a flowchart 1600 depicting operational steps of message detection program 104 in accordance with an embodiment of the present disclosure.

Message detection program 104 operates to build role model 122 initially based on data from one or more data sources 106 with an identification feature of each role in video 101. Message detection program 104 builds role model 122 through pre-process module 120 in role identification module 118. Message detection program 104 operates to sample frames of video 101 through sampling module 112. A frame is one of the many still images which compose the complete moving picture. Sampling module 112 may also compress the sampled frames of video 101. Message detection program 104 operates to identify and recognize key objects in each frame through object identification module 114. Object identification module 114 may use the object recognition technology for finding and identifying the key objects in each frame. Message detection program 104 operates to recognize movement scenarios associated with the roles in video 101 through movement recognition module 116. Movement recognition module 116 may generate frame description for each sampled frame using a convolutional neural network.

Message detection program 104 further operates to dynamically update role model 122 based on movement scenarios and conversation scripts in video 101 through role identification module 118. Message detection program 104 operates to identify role names based on the movement scenarios and conversation scripts through role identification module 118. Role identification module 118 may identify and match role names with recognized roles in video 101 based on the movement scenarios and conversation scripts. Message detection program 104 operates to generate description scripts associated with the movement scenarios for the roles in video 101 through description generation module 124. Message detection program 104 operates to output the description scripts generated in description generation module 124 through description output module 126. Description output module 126 may output description scripts by audio.

In step 1602, message detection program 104 builds role model 122 initially based on data from one or more data sources 106 with an identification feature of each role in video 101. Message detection program 104 builds role model 122 through pre-process module 120 in role identification module 118. Role model 122 is a machine learning model that is trained to recognize each role by the identification feature, such as a facial feature of roles. In one example, pre-process module 120 receives training data and builds role model 122 by analyzing a list of roles in video 101 and searching and receiving data associated with the roles from various data sources 106. An initial list of roles may, for example, be an actor list in video 101 (e.g., a movie). Data sources 106 may be, for example, from Internet in general, social media, and so on. Data from data sources 106 can be pictures of roles and can be as training data for role model 122.

In step 1604, message detection program 104 samples frames of video 101 through sampling module 112. A frame is one of the many still images which compose the complete moving picture. Sampling module 112 may also compress the sampled frames of video 101. In general, compression is a reversible conversion (encoding) of data that contains fewer bits than in original data. The reducing of data bits allows a more efficient storage and transmission of the data.

In step 1606, message detection program 104 identifies and recognizes key objects in each frame through object identification module 114. Object identification module 114 may use an object recognition technology for finding and identifying the key objects in each frame. The object recognition technology may include edge detection, edge matching, greyscale matching, gradient matching, appearance-based methods, feature-based methods, and other suitable recognition technology for identifying objects in an image or video frame. Object identification module 114 may identify people, animals, tools, and background objects from each frame. The identified objects may include roles in video 101. The roles may be people characters, cartoon characters or other characters presented in video 101.

In step 1608, message detection program 104 recognizes movement scenarios associated with the roles in video 101 through movement recognition module 116. The movement scenarios may be text descriptions of the movements associated with the roles. Movement recognition module 116 generates frame description for each sampled frame using a first neural network, for example, a convolutional neural network. The convolutional neural network can be a class of deep neural networks for analyzing the frames and generating frame descriptions. Movement recognition module 116 may remove unrelated information with roles in video 101 from frame descriptions of the sampled frames. Movement recognition module 116 may sort and arrange frame descriptions in a timeline sequence and enter the time-lined frame descriptions into a second neural network as input to recognize and generate movement scenarios associated with the roles. The second neural network, for example, can be a recurrent neural network. In an example, the recurrent neural network is a class of artificial neural networks where connections between nodes form a directed graph along a temporal sequence. A recurrent neural network may use its internal state (memory) to process sequences of inputs of frame descriptions. Movement recognition module 116 recognizes and generates movement scenarios associated with the roles in a timeline sequence through the recurrent neural network. In an example, the recurrent neural network is pre-trained with data and can recognize and generate movement scenarios in timeline based on frame descriptions.

In step 1610, message detection program 104 dynamically updates role model 122 based on movement scenarios and conversation scripts in video 101 through role identification module 118. Role identification module 118 may dynamically build and update role model 122 based on the movement scenarios recognized in movement recognition module 116. Role identification module 118 may dynamically build and update role model 122 based on conversation scripts from video 101. Conversation scripts can be saved and accessed from conversation scripts database 130. Role identification module 118 dynamically builds and updates role model 122 based on movement scenarios and conversation scripts using pre-process module 120. Pre-process module 120 may dynamically build and update role model 122 through NLP with conversations and movements in video 101. In an example, pre-process module 120 may directly capture conversation scripts provided in video 101. In another example, pre-process module 120 may generate conversation scripts using NPL techniques to convert voice messages to texts. Pre-process module 120 may save the generated conversation scripts into conversation scripts database 130. Movement scenarios are recognized in movement recognition module 116 and can be saved in movement scenarios database 128. In another example, pre-process module 120 may recognize names of roles based on conversation scripts and or movement records and further build and update role model 122.

In step 1612, message detection program 104 identifies role names based on the movement scenarios and conversation scripts through role identification module 118. Role identification module 118 may identify and match role names with recognized roles in video 101 based on the movement scenarios and conversation scripts. In an example, the conversation scripts can be available and accessible directly from video 101. In another example, the conversation scripts can be generated by using natural language processing techniques.

In step 1614, message detection program 104 generates description scripts associated with the movement scenarios for the roles in video 101 through description generation module 124. In an example, for each current frame, description generation module 124 determines whether any role name replacement has happened in current frame by reading role model 122 and matching any role name in current frame with role model 122. If description generation module 124 determines a role name replacement has happened, description generation module 124 outputs a role name for the current frame, for example, adding a description such as "role with such character descriptions turns out to be 'role name'". If description generation module 124 determines a role name replacement has not happened for current frame, description generation module 124 determines whether the current frame includes any movement scenario for any role. If yes, description generation module 124 adds a role name to the associated role movement in description.

In step 1616, message detection program 104 outputs the description scripts generated in description generation module 124 through description output module 126. In an example, description output module 126 may output description scripts by audio. In another example, description output module 126 may output description scripts by texts or any other suitable output methods for an audience to understand.

Figure 17:
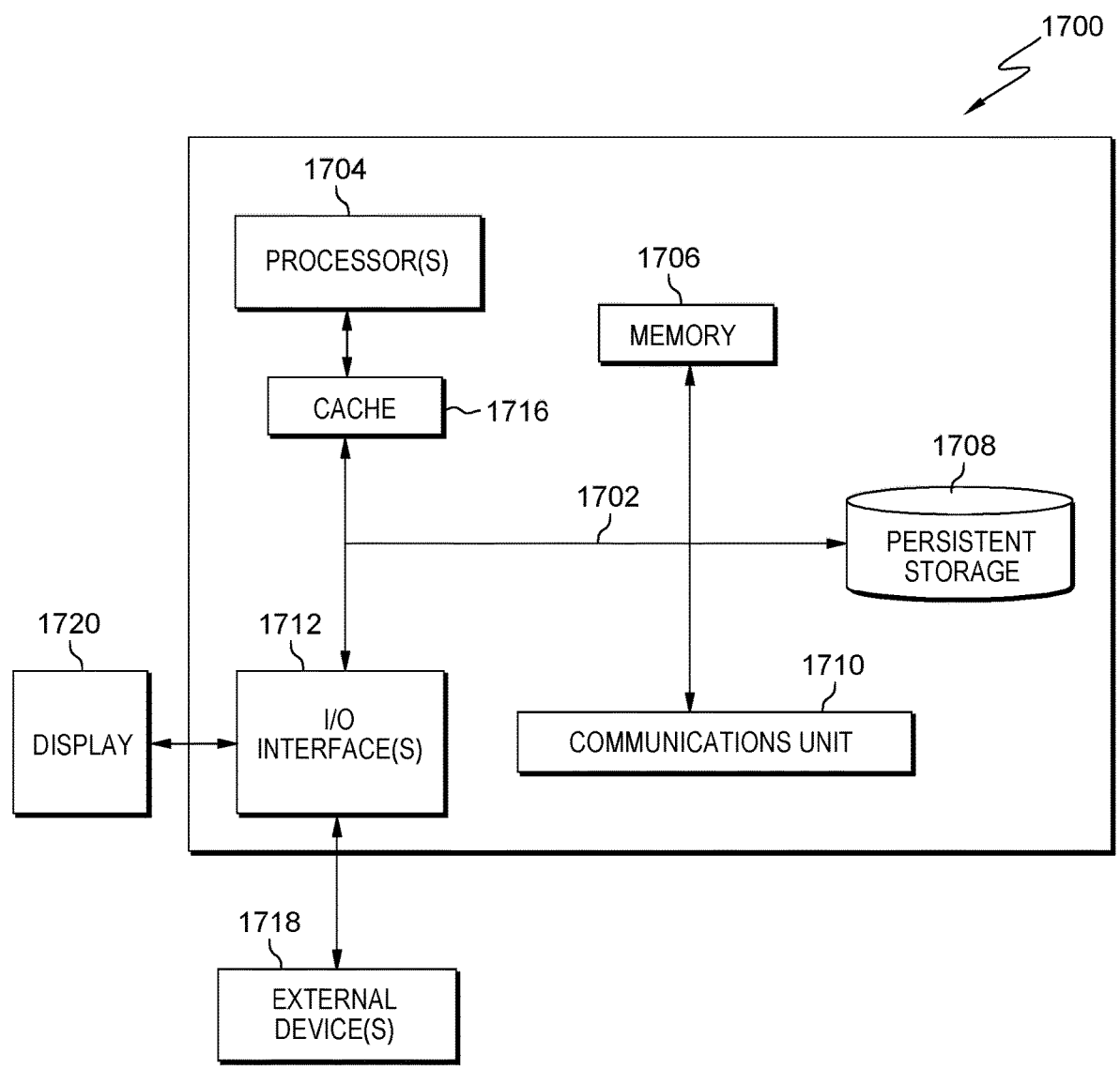
FIG. 17 is a block diagram of components of the computing device of FIG. 1, in accordance with an embodiment of the present disclosure.

FIG. 17 depicts a block diagram 1700 of components of computing device 102 in accordance with an illustrative embodiment of the present disclosure. It should be appreciated that FIG. 17 provides only an illustration of one implementation and does not imply any limitations with regard to the environments in which different embodiments may be implemented. Many modifications to the depicted environment may be made.

Computing device 102 may include communications fabric 1702, which provides communications between cache 1716, memory 1706, persistent storage 1708, communications unit 1710, and input/output (I/O) interface(s) 1712. Communications fabric 1702 can be implemented with any architecture designed for passing data and/or control information between processors (such as microprocessors, communications and network processors, etc.), system memory, peripheral devices, and any other hardware components within a system. For example, communications fabric 1702 can be implemented with one or more buses or a crossbar switch.

Memory 1706 and persistent storage 1708 are computer readable storage media. In this embodiment, memory 1706 includes random access memory (RAM). In general, memory 1706 can include any suitable volatile or non-volatile computer readable storage media. Cache 1716 is a fast memory that enhances the performance of computer processor(s) 1704 by holding recently accessed data, and data near accessed data, from memory 1706.

Message detection program 104 may be stored in persistent storage 1708 and in memory 1706 for execution by one or more of the respective computer processors 1704 via cache 1716. In an embodiment, persistent storage 1708 includes a magnetic hard disk drive. Alternatively, or in addition to a magnetic hard disk drive, persistent storage 1708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1708 may also be removable. For example, a removable hard drive may be used for persistent storage 1708. Other examples include optical and magnetic disks, thumb drives, and smart cards that are inserted into a drive for transfer onto another computer readable storage medium that is also part of persistent storage 1708.

Communications unit 1710, in these examples, provides for communications with other data processing systems or devices. In these examples, communications unit 1710 includes one or more network interface cards. Communications unit 1710 may provide communications through the use of either or both physical and wireless communications links. Message detection program 104 may be downloaded to persistent storage 1708 through communications unit 1710.

I/O interface(s) 1712 allows for input and output of data with other devices that may be connected to computing device 102. For example, I/O interface 1712 may provide a connection to external devices 1718 such as a keyboard, keypad, a touch screen, and/or some other suitable input device. External devices 1718 can also include portable computer readable storage media such as, for example, thumb drives, portable optical or magnetic disks, and memory cards. Software and data used to practice embodiments of the present invention, e.g., message detection program 104 can be stored on such portable computer readable storage media and can be loaded onto persistent storage 1708 via I/O interface(s) 1712. I/O interface(s) 1712 also connect to display 1720.

Display 1720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
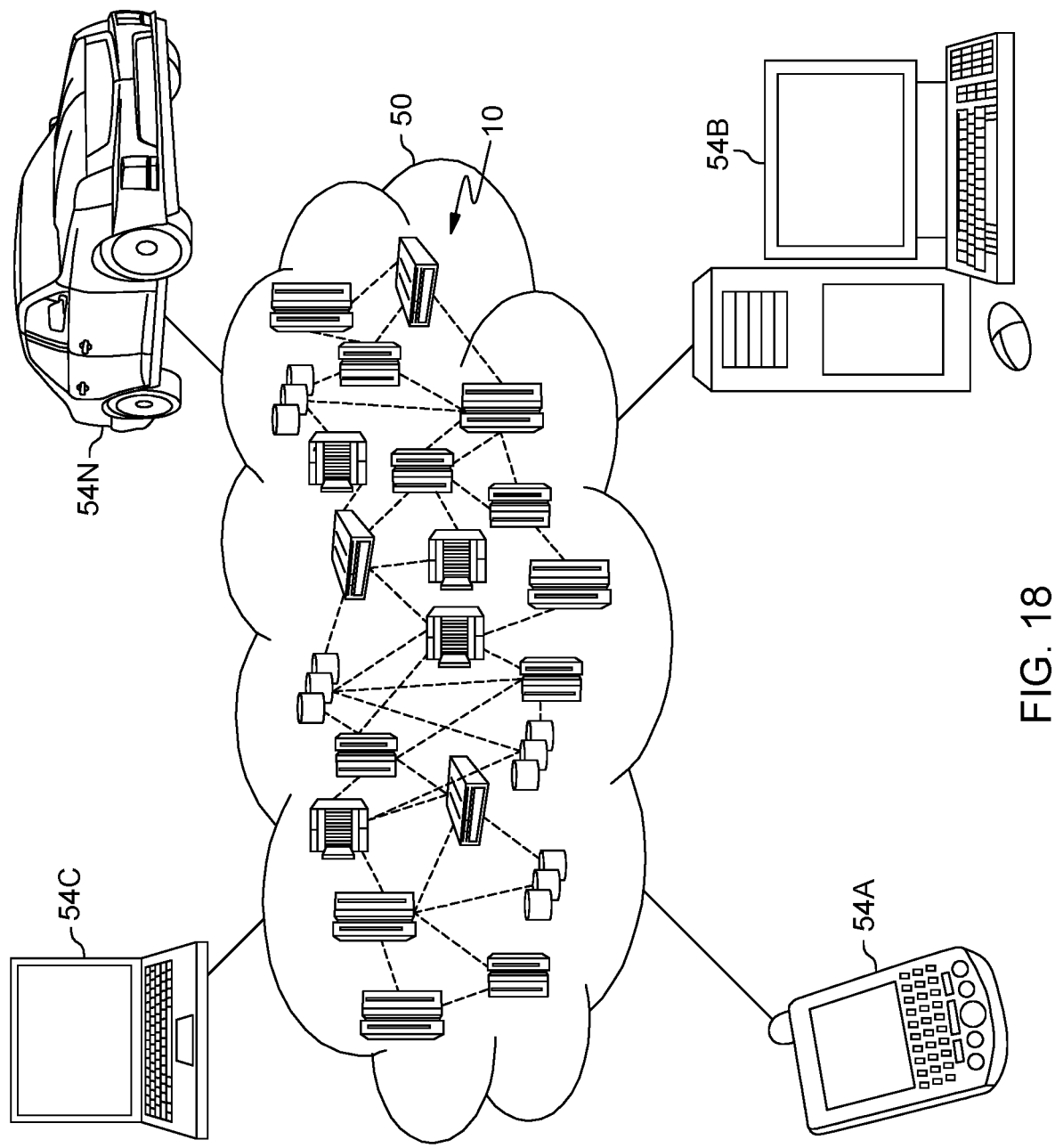
FIG. 18 depicts an embodiment of a cloud computing environment in accordance with the present disclosure.

Referring now to FIG. 18, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 19:
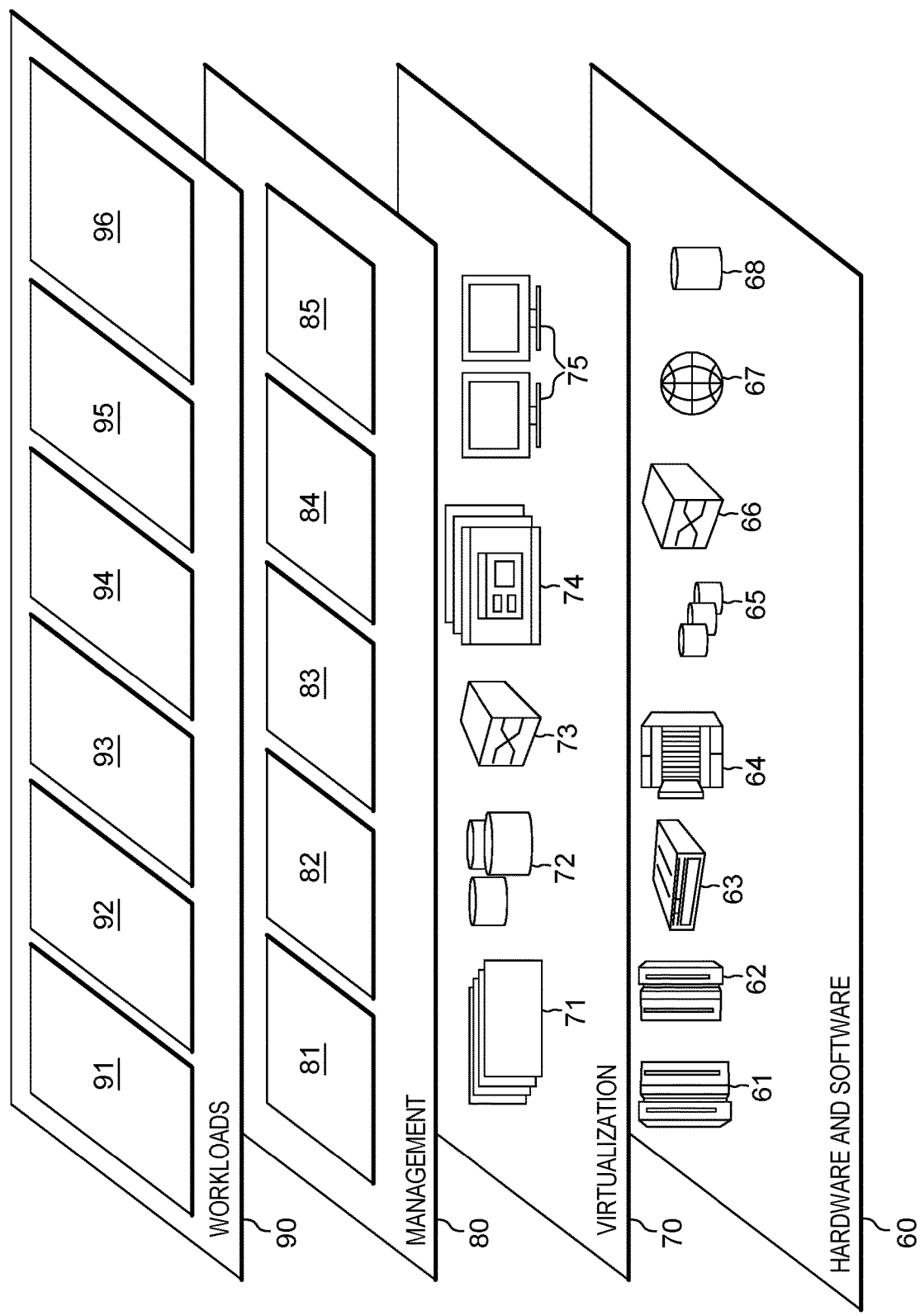
FIG. 19 depicts an embodiment of abstraction model layers of a cloud computing environment, in accordance with the present disclosure.

Referring now to FIG. 19, a set of functional abstraction layers provided by cloud computing environment 50 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, message detection program 104 as described above with respect to the video message detection environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
building, by one or more processors, a role model, based on data from one or more data sources, with an identification feature of each role in a video, the role model comprising a machine learning model trained to recognize each role by each respective identification feature;
sampling, by one or more processors, a plurality of frames of the video;
identifying, by one or more processors, a key object presented in the plurality of frames, the key object being a role in the video;
recognizing, by one or more processors, a movement scenario associated with the role, including:
generating a frame description for each frame through a first neural network,
removing information from each frame that is not associated with the role in the frame,
upon removing the information that is not associated with the role, entering the plurality of frames, in a timeline sequence, to a second neural network, and
generating the movement scenario associated with the role in the timeline sequence, the movement scenario being a text description associated with the movement;
dynamically updating, by one or more processors, the role model based on the movement scenario;
identifying, by one or more processors, a role name based on the movement scenario;
generating, by one or more processors, a description script associated with the movement scenario for the role; and
outputting, by one or more processors, the description script.

2. The computer-implemented method of claim 1, wherein the identification feature is a facial feature.

3. The computer-implemented method of claim 1, wherein the first neural network is a convolutional neural network.

4. The computer-implemented method of claim 1, wherein the second neural network is a recurrent neural network.

5. The computer-implemented method of claim 1, wherein dynamically updating the role model is based on conversation scripts generated by using natural language processing techniques.

6. The computer-implemented method of claim 1, wherein identifying the role names is based on conversation scripts generated by using natural language processing techniques.

7. The computer-implemented method of claim 1, wherein outputting the description script includes outputting the description script by audio.

8. A computer program product comprising:
one or more computer readable storage media and program instructions stored on the one or more computer readable storage media, the program instructions comprising:
program instructions to build a role model, based on data from one or more data sources, with an identification feature of each role in a video, the role model comprising a machine learning model trained to recognize each role by each respective identification feature;
program instructions to sample a plurality of frames of the video;
program instructions to identify a key object presented in the plurality of frames, the key object being a role in the video;
program instructions to recognize a movement scenario associated with the role, including: program instructions, stored on the one or more computer-readable storage media,
to generate a frame description for each frame through a first neural network,
to remove information from each frame that is not associated with the role in the frame,
upon removing the information that is not associated with the role, to enter the plurality of frames, in a timeline sequence, to a second neural network, and
to generate the movement scenario associated with the role in the timeline sequence, the movement scenario being a text description associated with the movement;
program instructions to dynamically update the role model based on the movement scenario;
program instructions to identify a role name based on the movement scenario;
program instructions to a description script associated with the movement scenario for the role; and
program instructions to output the description script.

9. The computer program product of claim 8, wherein the identification feature is a facial feature.

10. The computer program product of claim 8, wherein the first neural network is a convolutional neural network.

11. The computer program product of claim 8, wherein the second neural network is a recurrent neural network.

12. The computer program product of claim 8, wherein program instructions to dynamically update the role model are based on conversation scripts generated by using natural language processing techniques.

13. The computer program product of claim 8, wherein program instructions to identify role names are based on conversation scripts generated by using natural language processing techniques.

14. The computer program product of claim 8, wherein program instructions to output the description script include program instructions to output the description script by audio.

15. A computer system comprising:
one or more computer processors, one or more computer readable storage media, and program instructions stored on the one or more computer readable storage media for execution by at least one of the one or more computer processors, the program instructions comprising:
program instructions to build a role model, based on data from one or more data sources, with an identification feature of each role in a video, the role model comprising a machine learning model trained to recognize each role by each respective identification feature;
program instructions to sample a plurality of frames of the video;
program instructions to identify a key object presented in the plurality of frames, the key object being a role in the video;
program instructions to recognize a movement scenario associated with the role, including: program instructions, stored on the one or more computer-readable storage media,
to generate a frame description for each frame through a first neural network,
to remove information from each frame that is not associated with the role in the frame,
upon removing the information that is not associated with the role, to enter the plurality of frames, in a timeline sequence, to a second neural network, and
to generate the movement scenario associated with the role in the timeline sequence, the movement scenario being a text description associated with the movement;
program instructions to dynamically update the role model based on the movement scenario;
program instructions to identify a role name based on the movement scenario;
program instructions to a description script associated with the movement scenario for the role; and
program instructions to output the description script.

16. The computer system of claim 15, wherein the identification feature is a facial feature.

17. The computer system of claim 15, wherein the first neural network is a convolutional neural network.

18. The computer system of claim 15, wherein the second neural network is a recurrent neural network.

19. The computer system of claim 15, wherein program instructions to dynamically update the role model are based on conversation scripts generated by using natural language processing techniques.

20. The computer system of claim 15, wherein program instructions to output the description script include program instructions to output the description script by audio.

* * * * *